(12) United States Patent
Visos-Ely et al.

(10) Patent No.: US 11,995,971 B2
(45) Date of Patent: *May 28, 2024

(54) SYSTEM INCLUDING GRIP ASSEMBLY AND HIP SENSING ASSEMBLY FOR ROLLATOR CONFIGURED TO PROVIDE FEEDBACK TO USER

(71) Applicant: Stride Tech Medical Inc., Boulder, CO (US)

(72) Inventors: Timothy Visos-Ely, Westminster, CO (US); Andrew Jeffrey Plum, Centennial, CO (US); Maxwell D. Watrous, Fort Collins, CO (US); Humsini Kadiresan Acharya, Boulder, CO (US); Thomas Saunders, Aurora, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,030

(22) Filed: Feb. 3, 2022

(65) Prior Publication Data

US 2022/0157150 A1 May 19, 2022

Related U.S. Application Data

(63) Continuation of application No. 17/000,079, filed on Aug. 21, 2020, now Pat. No. 11,276,294.

(Continued)

(51) Int. Cl.
*G08B 21/18* (2006.01)
*A61H 3/04* (2006.01)
(Continued)

(52) U.S. Cl.
CPC ............. *G08B 21/182* (2013.01); *A61H 3/04* (2013.01); *G01B 21/16* (2013.01); *G01L 5/0028* (2013.01);
(Continued)

(58) Field of Classification Search
CPC ........ G08B 21/182; A61H 3/04; G01B 21/16; G01L 5/0028; G01P 15/00
See application file for complete search history.

(56) References Cited

U.S. PATENT DOCUMENTS

| 5,477,211 A | 12/1995 | Reynolds |
| 7,963,294 B1 | 6/2011 | Trout |

(Continued)

FOREIGN PATENT DOCUMENTS

| CA | 2963072 A1 | 5/2015 |
| CA | 2936983 A1 | 1/2018 |

(Continued)

OTHER PUBLICATIONS

International Search Report and Written Opinion issued in connection with PCT Application No. PCT/US2020/047508 dated Oct. 12, 2020.

*Primary Examiner* — Curtis B Odom
(74) *Attorney, Agent, or Firm* — Benesch Friedlander Coplan & Aronoff LLP

(57) ABSTRACT

An example system coupled to a rollator for monitoring usage of the rollator, includes a grip assembly and/or a hip sensing assembly. The grip assembly includes a first sensor configured to detect a force applied to the first sensor. The hip sensing assembly includes a second sensor configured to measure a distance between the second sensor and a hip of the user positioned with respect to the rollator. A microcontroller is electronically coupled in signal communication with the first sensor, the second sensor, and a feedback circuitry. When the force applied to the first sensor exceeds a first threshold, the microcontroller activates the feedback circuitry to generate a first response indicating that the first threshold has been exceeded. When the distance exceeds a second threshold, the microcontroller activates the feedback (Continued)

circuitry to generate a second response indicating that the second threshold has been exceeded.

22 Claims, 19 Drawing Sheets

Related U.S. Application Data

(60) Provisional application No. 62/891,357, filed on Aug. 25, 2019.

(51) Int. Cl.
  *G01B 21/16* (2006.01)
  *G01L 5/00* (2006.01)
  *G01P 15/00* (2006.01)
(52) U.S. Cl.
  CPC ...... *G01P 15/00* (2013.01); *A61H 2201/5061* (2013.01)

(56) References Cited

U.S. PATENT DOCUMENTS

| | | | |
|---|---|---|---|
| 11,276,294 B2* | 3/2022 | Visos-Ely | G01L 5/0028 |
| 2006/0292533 A1 | 12/2006 | Selod | |
| 2008/0042853 A1 | 2/2008 | Dempsey | |
| 2010/0100013 A1 | 4/2010 | Hu et al. | |
| 2011/0166753 A1 | 7/2011 | Yu et al. | |
| 2013/0167888 A1 | 7/2013 | LoSasso | |
| 2015/0066325 A1 | 3/2015 | Tanaka | |
| 2016/0253890 A1* | 9/2016 | Rabinowitz | A61B 5/225 |
| | | | 340/539.13 |
| 2016/0287166 A1 | 10/2016 | Tran | |
| 2016/0299502 A1 | 10/2016 | Chamberlain et al. | |
| 2017/0172462 A1 | 6/2017 | Alghazi | |

FOREIGN PATENT DOCUMENTS

| | | |
|---|---|---|
| CA | 3031561 A1 | 1/2018 |
| EP | 3000456 B1 | 3/2016 |
| EP | 3066982 A1 | 9/2016 |

\* cited by examiner

SYSTEM INCLUDING GRIP ASSEMBLY AND HIP SENSING ASSEMBLY FOR ROLLATOR CONFIGURED TO PROVIDE FEEDBACK TO USER

CROSS-REFERENCE TO RELATED APPLICATION

This application is a continuation of prior application Ser. No. 17/000,079, filed Aug. 21, 2020, which claims the benefit of U.S. Provisional Application No. 62/891,357 filed on Aug. 25, 2019. The disclosures of the aforementioned applications are incorporated herein by reference in their entirety.

BACKGROUND

Rollators or walkers allow users to stabilize themselves while walking, increase the user's mobility, and decrease a risk of falling while walking.

BRIEF DESCRIPTION OF THE DRAWINGS

Corresponding reference numbers indicate corresponding parts throughout the drawings.

DETAILED DESCRIPTION

Figure 1:
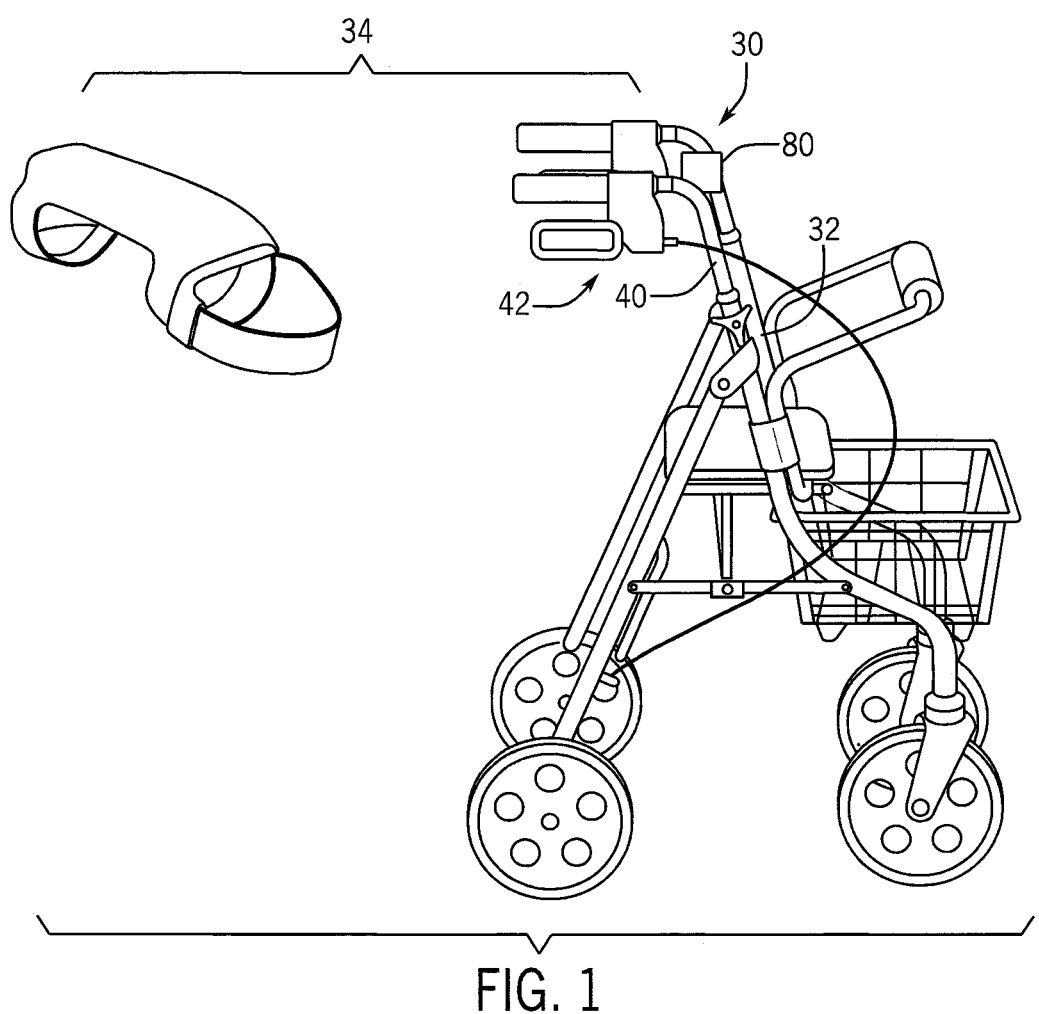
FIG. 1 is an exploded perspective view of an example rollator, according to an example embodiment.

Various example embodiments and/or implementations will be described in detail with reference to the accompanying drawings. The same reference numbers may be used throughout the drawings to refer to the same or like parts. References made throughout this disclosure relating to specific embodiments and implementations are provided solely for illustrative purposes but, unless indicated to the contrary, are not meant to limit all embodiments and/or implementations. The following detailed description of certain example embodiments or implementations will be better understood when read in conjunction with the appended drawings.

Rollators or walkers allow users to stabilize themselves while walking, increase their mobility, and decrease a risk of falling while walking. Aspects of the disclosure facilitate training users to properly utilize rollators and develop or improve proper walking habits to increase the user's mobility and reduce fall risk. Proper walking habits include, for example, positioning or centering a user's hips with respect to, e.g., at least partially within, a frame of the rollator and applying minimal weight on the rollator handles. The example embodiments described herein provide a system including a grip assembly to measure an amount of weight (e.g., force) the user applies to the rollator handles and/or and a hip sensing assembly to measure a distance between the user's hips and the rollator frame to facilitate maintaining upper musculoskeletal strength and proper body balance. In addition to having real-time feedback, the example system collects data relating to the user's overall walking habits. As data is collected, a dashboard can be developed to monitor the user's mobility and behavioral trends. In example embodiments, proper rollator use is determined by a few simple rules. First, the user positions his/her hips at least partially within the rollator frame so that the user's feet cross a base line between the rear legs of the rollator when walking. Second, the rollator should not support more than determined percentage of the user's bodyweight, e.g., 10% of the user's bodyweight.

Aspects of the disclosure provide an example system operatively coupled to a rollator for monitoring usage of the rollator. The system includes a grip assembly configured to be coupled to a handle member of the rollator. A first sensor coupled to the handle member detects a force applied by a user to the grip assembly, e.g., applied to the first sensor, and generates a signal representative of a force value detected by the first sensor. A feedback circuitry is operatively coupled to the first sensor and a microcontroller is electronically coupled in signal communication with the first sensor and the feedback circuitry. When the force applied to the grip assembly detected by the first sensor exceeds a first threshold, the microcontroller activates the feedback circuitry to generate a first response indicating to the user of the rollator that the first threshold has been exceeded.

In example embodiments, the system also includes a hip sensing assembly configured to be coupled to the handle member of the rollator. The hip sensing assembly includes a second sensor coupled in signal communication with the microcontroller. The second sensor is coupled to the handle member of the rollator to measure a distance between the second sensor and a hip of the user positioned with respect to the rollator, e.g., at least partially positioned within a frame of the rollator. When the distance detected by the second sensor exceeds a second threshold, the microcontroller activates the feedback circuitry to generate a second response indicating to the user that the second threshold has been exceeded. The first response and/or the second response include a visual response, an auditory response, a haptic response, and/or a vibration response, and/or another suitable response.

Figure 2:
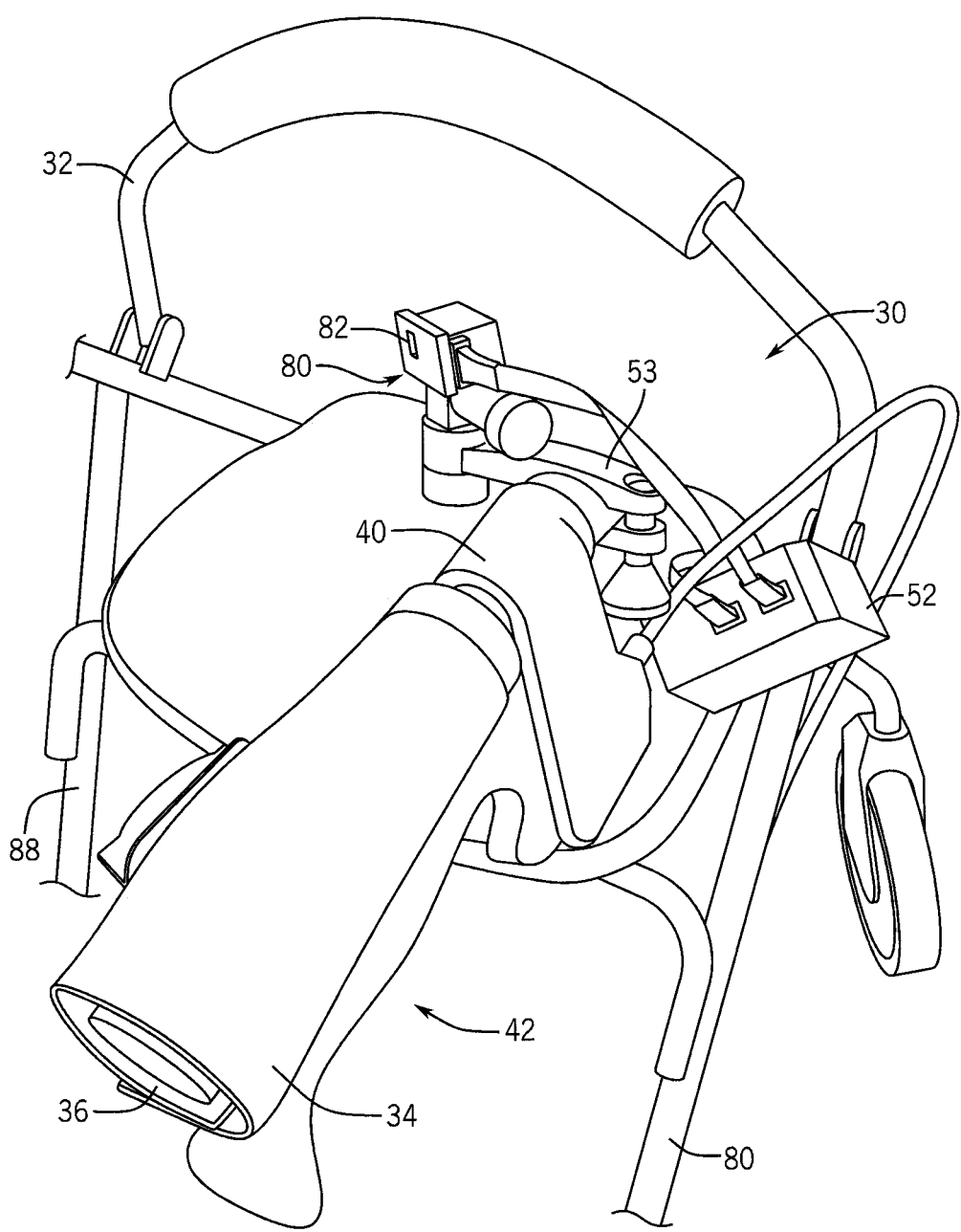
FIG. 2 is a perspective view of an example rollator, according to an example embodiment.
Figure 3:
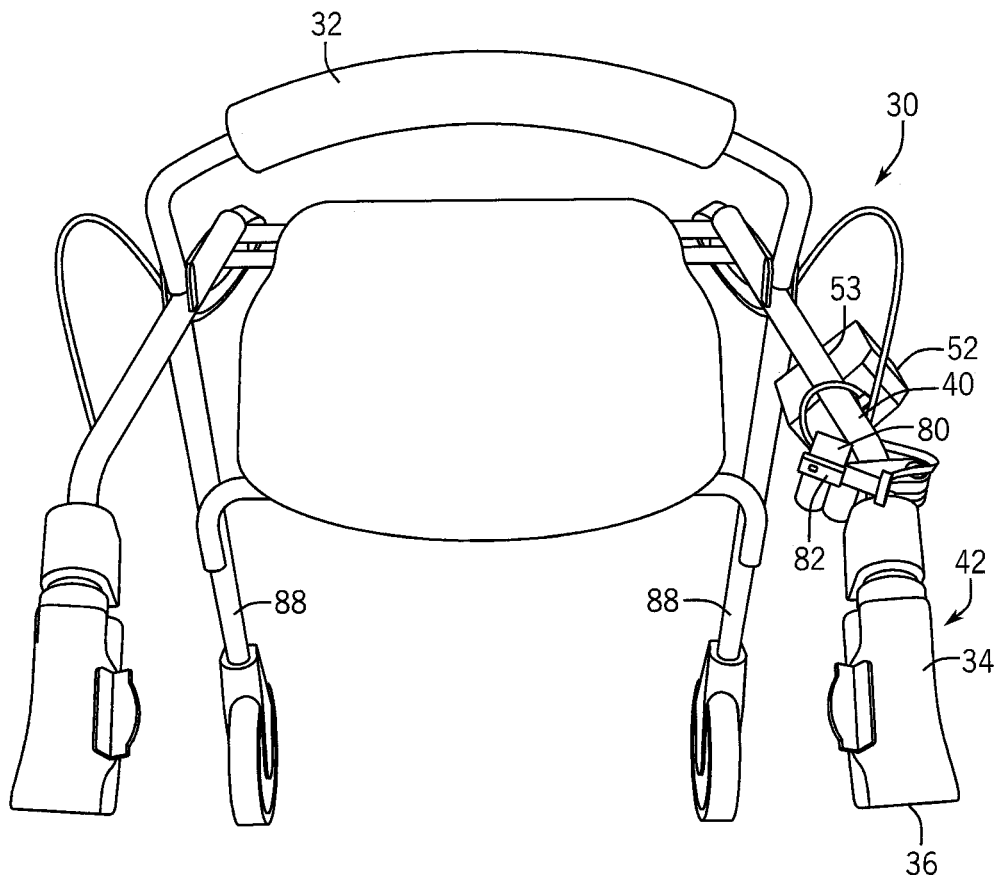
FIG. 3 is a top view of the example rollator shown in FIG. 2.

Referring further to the figures, FIG. 1 is an exploded perspective view of an example rollator, according to an example embodiment. FIG. 2 is a perspective view of an alternative example rollator, according to an example embodiment. FIG. 3 is a top view of the example rollator shown in FIG. 2.

Figure 4:
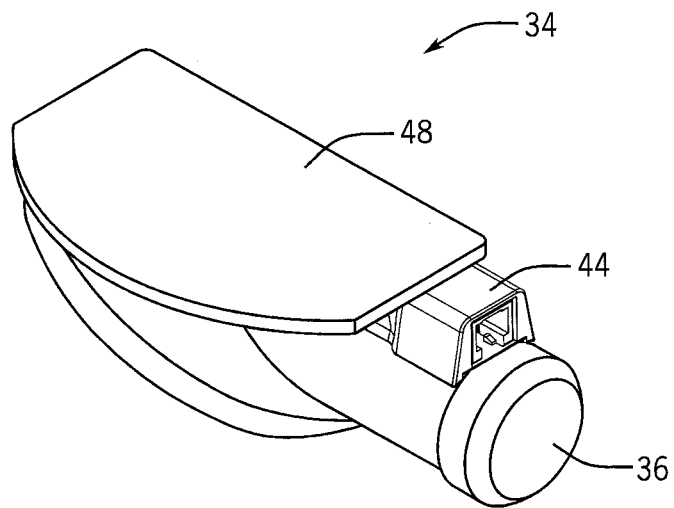
FIG. 4 is a perspective view of a grip assembly, according to an example embodiment.
Figure 5:
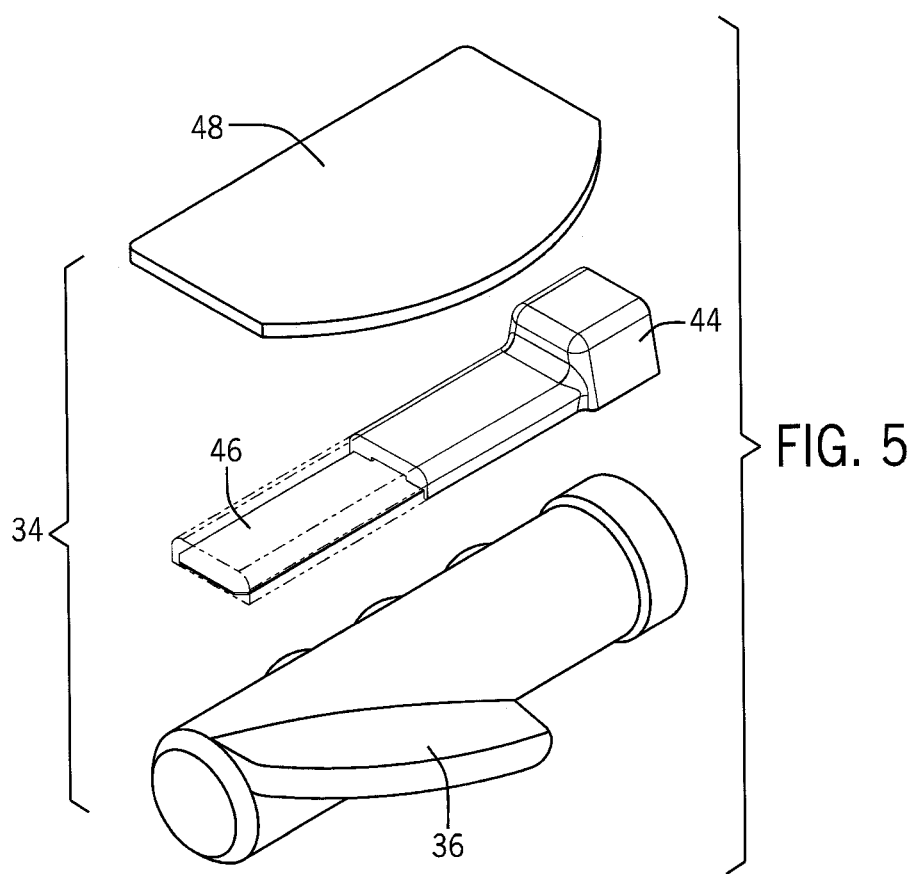
FIG. 5 is an exploded perspective view of the grip assembly shown in FIG. 4.

As shown in FIGS. 1-3, an example system 30 is operatively coupled to a rollator 32 for monitoring usage of rollator 32. In example embodiments, system 30 includes a grip assembly 34, as further shown in FIGS. 4 and 5. In an example embodiment, grip assembly 34 includes a hand grip 36 configured to be coupled to a handle member 40 of rollator 32. As shown in FIGS. 1-3, hand grip 36 is coupled to an end portion 42 of handle member 40. Referring further to FIGS. 4 and 5, grip assembly 34 also includes a sensor node 44 having a first sensor 46, such as a force sensor, e.g., a force sensitive resistor (FSR), a capacitive sensor, a load cell, a strain gauge, and/or another suitable sensor, positioned on, in, under, or over hand grip 36 and configured to detect a force applied by the user on grip assembly 34. In example embodiments, at least a portion of sensor node 44, e.g., at least a portion of first sensor 46, may be directly coupled or indirectly coupled to one or more layers of hand grip 36, coupled to a surface, such as an outer surface or outer layer and/or an inner surface or inner layer, of hand grip 36, or integrated with hand grip 36. As discussed in greater detail below, sensor node 44 includes suitable circuitry, such as a circuit board, operatively coupled in signal communication with a central processing unit to transmit and receive electronic signals. In example embodiments, padded grip cover 48 is positioned on or over at least a portion of sensor node 44 and/or at least a portion of hand grip 36 to collectively form grip assembly 34. Padded grip cover 48 can be directly or indirectly coupled to sensor node 44 and/or hand grip 36 using a suitable fastening system including, without limitation, one or more elastic bands, a hook-and-loop fastening system, and/or an adhesive material.

Figure 10:
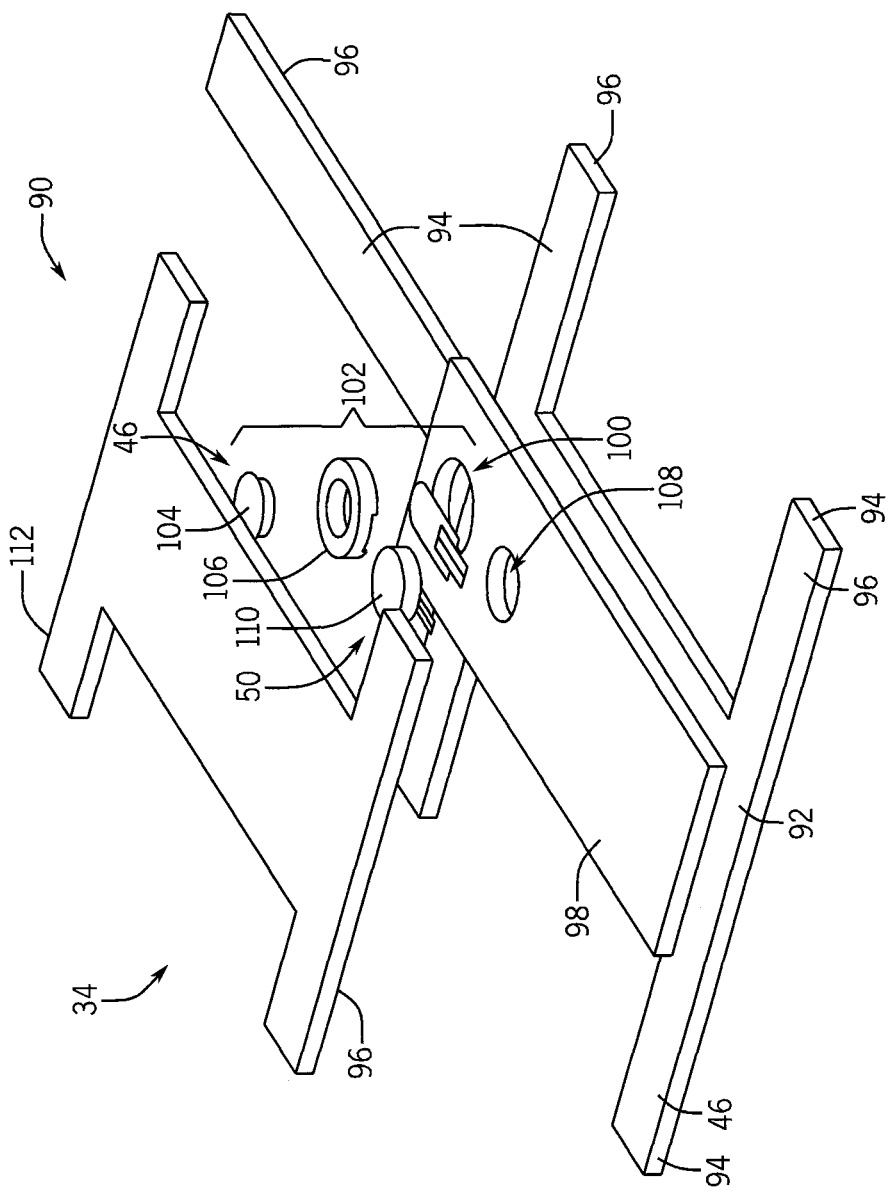
FIG. 10 is an exploded perspective view of an example grip cover for a grip assembly, according to an example embodiment.
Figure 11:
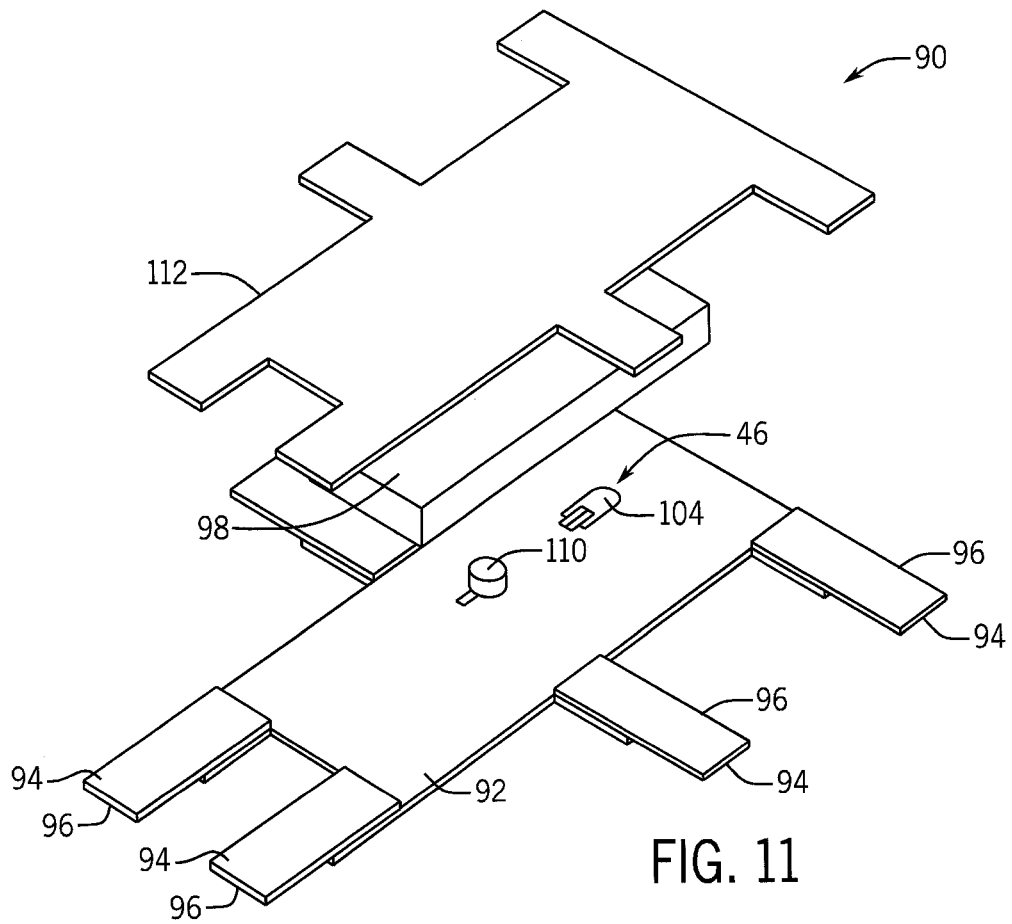
FIG. 11 is an exploded perspective view of an alternative example grip cover for a grip assembly, according to an example embodiment.
Figure 13:
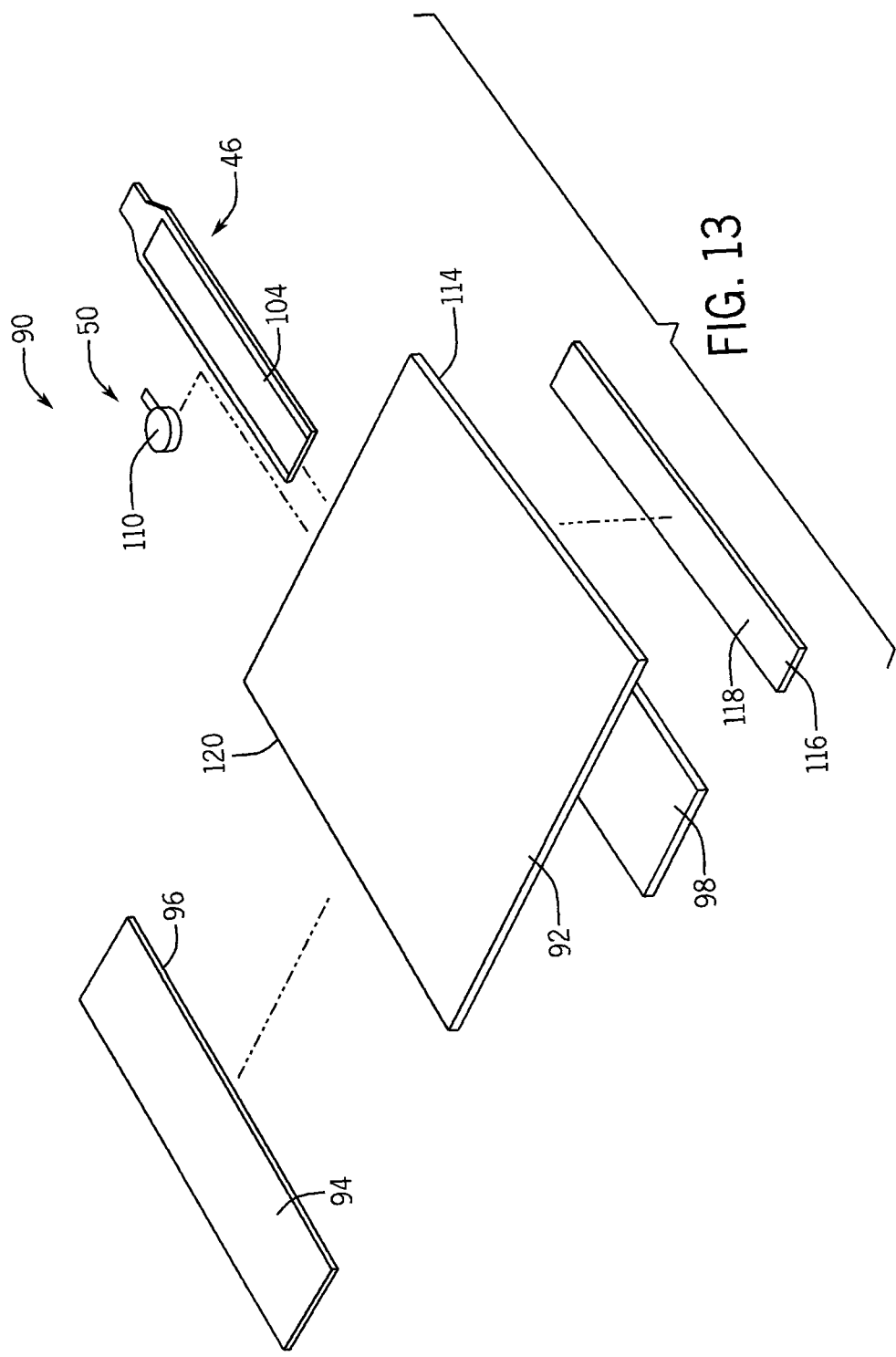
FIG. 13 is an exploded perspective view of the example grip cover for a grip assembly shown in FIG. 12.

In example embodiments, first sensor 46 is configured to detect a force, e.g., weight applied by the user, to grip assembly 34, and more specifically, to first sensor 46 by the user of rollator 32 during rollator use. First sensor 46 is configured to generate a signal representative of a force value detected by first sensor 46 on and/or in proximity to first sensor 46. A feedback circuitry 50 is operatively coupled to first sensor 46. In example embodiments, feedback circuitry 50 includes a vibration motor 110 as shown in FIGS. 10, 11, and 13, for example, a light source, a speaker, and/or other suitable mechanisms or devices configured to generate a suitable vibration response, haptic response, visual response, and/or auditory response to instruct the user to adjust the user's position with respect to rollator 32 and/or to maintain a better posture.

Figure 6:
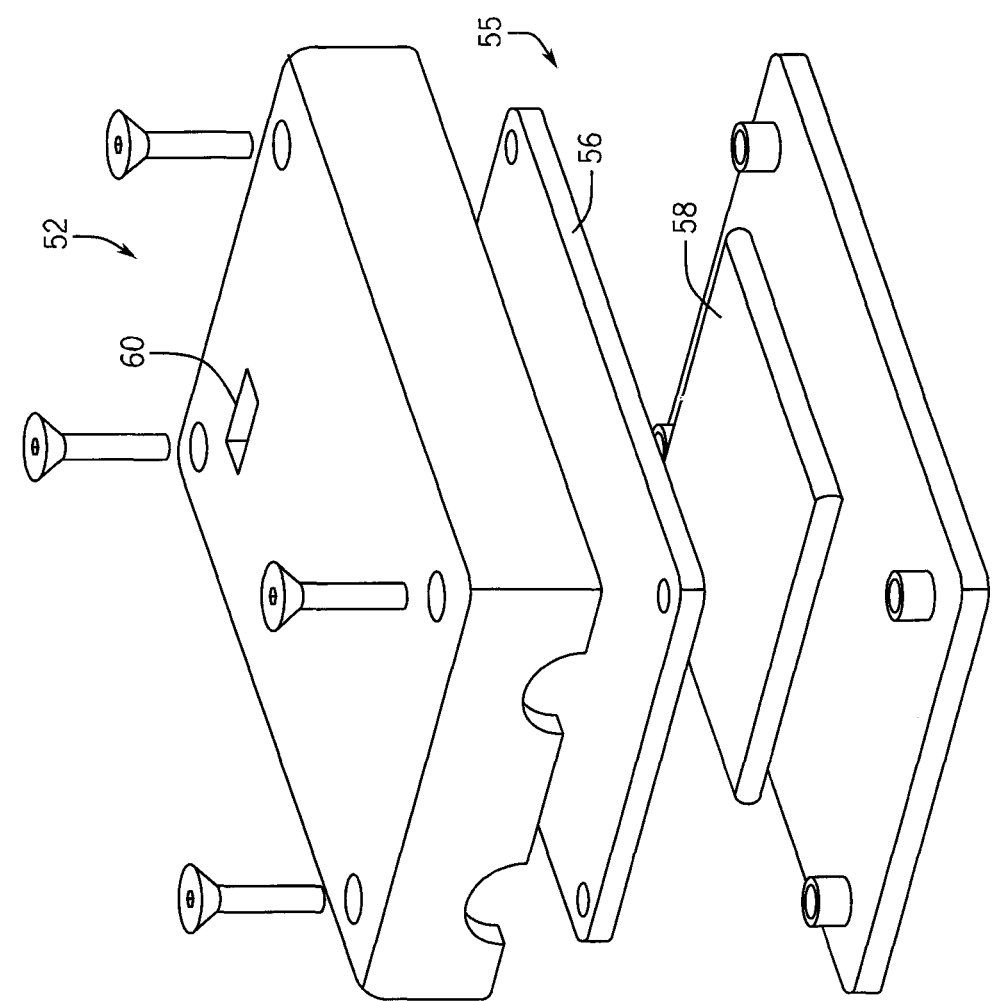
FIG. 6 is an exploded perspective view of an example electronics circuitry, according to an example embodiment.
Figure 7:
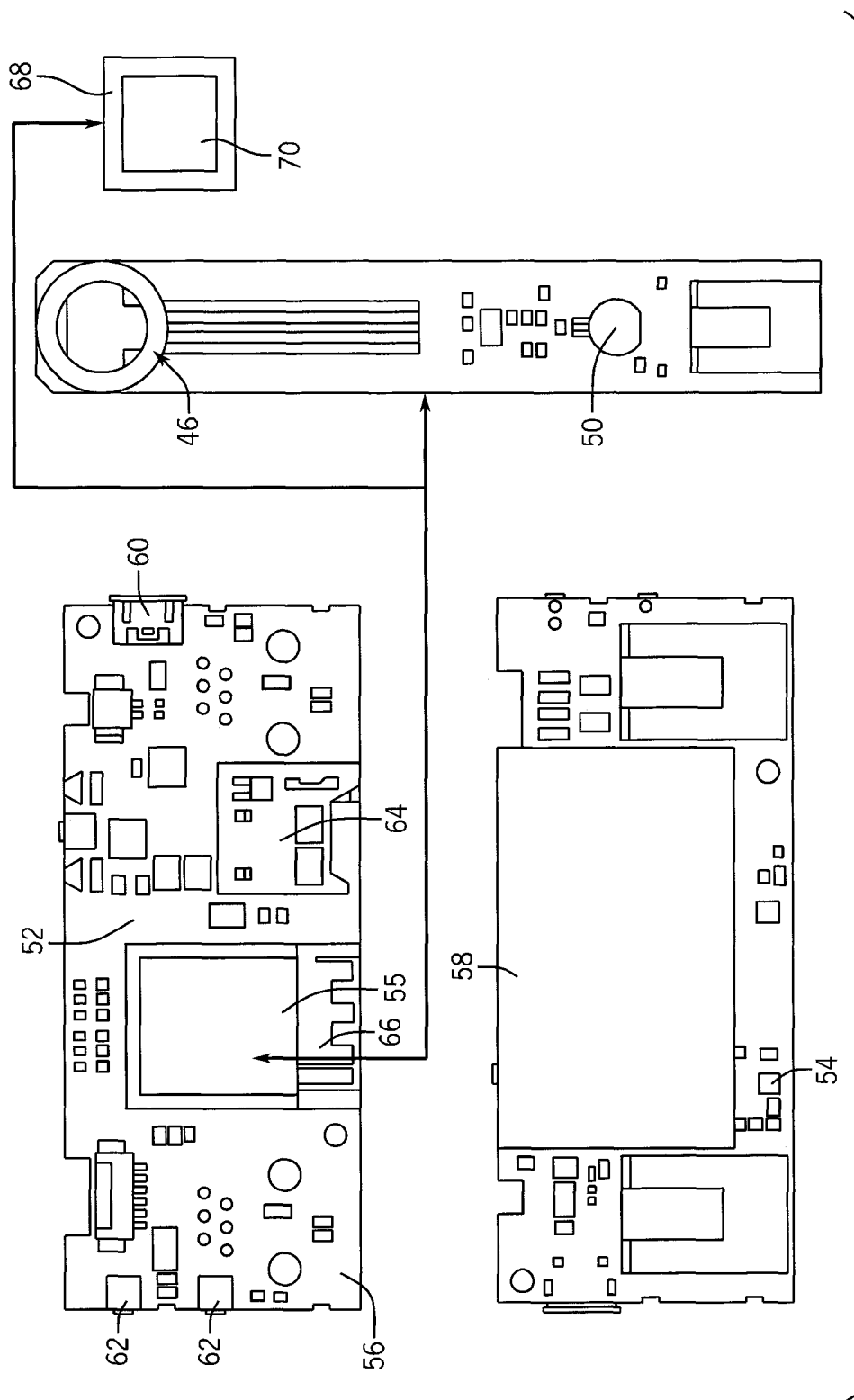
FIG. 7 illustrates an example electrical system suitable for use with the example electronics circuitry shown in FIG. 6.

Referring further to FIGS. 6 and 7, for example, an electronics circuitry 52, such as a suitable central processing unit, is operatively coupled to first sensor 46 and feedback circuitry 50. As shown in FIGS. 2 and 3, electronics circuitry 52 is coupled to a frame of rollator 32, e.g., on handle member 40, using a suitable coupling member, such as a clamp system 53. In example embodiments, one or more of components of electronics circuitry 52 is directly coupled or indirectly coupled to one or more layers of hand grip 36, coupled to a surface, such as an outer surface or outer layer and/or an inner surface or inner layer, of hand grip 36, or integrated with hand grip 36. In particular example embodiments, electronics circuitry 52 is integrated with hand grip 36. Electronics circuitry 52 securely houses IoT electronics and a rechargeable lithium battery, for example, within a durable plastic housing. The electrical systems located within the housing include a wireless connection circuitry, e.g., Wi-Fi circuitry, configured to transmit and receive electronic signals, transmit data signals to a remote server, such as a cloud-based server, and update firmware remotely. A battery charging system with charge protection may also be housed within the housing. An accelerometer 54 monitors rollator activity to detect dangerous habits and activate low power mode to conserve battery life, for example. A suitable local memory including, without limitation, a flash memory chip or a Micro SD reader, enables electronics circuitry 52 to store data locally until Wi-Fi connection can be achieved.

As shown in FIG. 7, electronics circuitry 52 includes a microcontroller 55, such as an Espressif ESP32 microcontroller, electronically coupled in signal communication with first sensor 46 and feedback circuitry 50. In alternative embodiments, electronics circuitry 52 includes any suitable microcontroller including, without limitation, an Arduino Uno microcontroller or a Sparkfun Arduino mini-microcontroller. As shown in FIGS. 6 and 7, microcontroller 55 includes a printed circuit board 56 operatively coupled to a suitable power source, such as a battery 58, e.g., a rechargeable lithium polymer battery or another suitable battery. In example embodiments, battery 58 is rechargeable through a suitable electrical connector, such as a USB port 60.

In example embodiments, when the force applied to grip assembly 34 as detected by first sensor 46 exceeds a first threshold, microcontroller 55 activates feedback circuitry 50 to generate a first response indicating to the user of rollator 32 that the first threshold has been exceeded. Microcontroller 55 is configured to adjust the first threshold to a value related to a bodyweight of the user, for example. In example embodiments, the first threshold is set to a value up to and including 20% of a bodyweight of the user, more particularly, to a force value between 5% to 10% of a bodyweight of the user, or alternatively, to a value not greater than 10% of a bodyweight of the user. In alternative embodiments, the first threshold may be set to any suitable force value based at least in part on the bodyweight of the user and/or a level of mobility of the user, for example.

Figure 22:
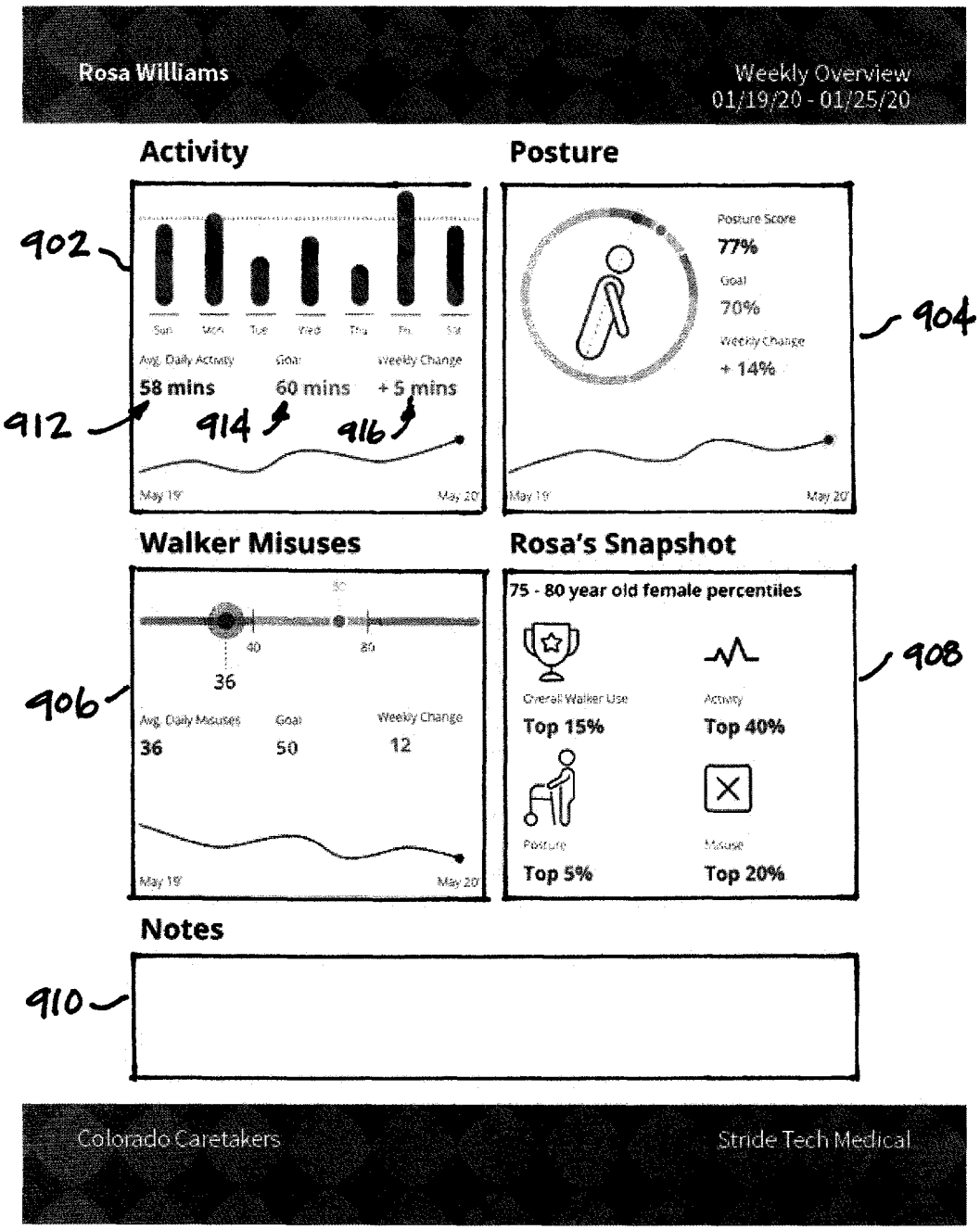
FIG. 22 is an individualized periodic overview report for an individual patient generated using data collected related to the patient's use of an example rollator equipped with the example system, according to an example embodiment.

Microcontroller 55 is also configured to adjust an intensity of the first response generated by feedback circuitry 50 based at least in part on the force value. In a particular embodiment, one or more dials 62 shown schematically in FIG. 7, a button, or another suitable mechanism is operatively coupled to microcontroller 55. Dial 62 is adjustable by the user to adjust the intensity of the first response. As shown in FIG. 7, electronics circuitry 52 also includes a local data storage device or local memory 64, such as a flash memory chip or a Micro SD reader, coupled in signal communication with microcontroller 55 for storing data collected by microcontroller 55 and a wireless communication circuitry 66, such as a WiFi™ or other suitable wireless networking compatible device, in signal communication with a remote computing device 68 including, without limitation, a computer and/or a server, or a mobile computing device, e.g., the user's smart phone. Wireless communication circuitry 66 is configured to transmit one or more data signals to remote computing device 68 for further processing, transmission, and/or storage of the data signal(s) and corresponding data. In an example embodiment, microcontroller 55 is configured to generate real-time biofeedback to prompt the user to self-correct to a safe posture and position. In example embodiments, remote computing device 68 includes a display screen 70 configured to display one or more screens or dashboards including information related to the data collected, stored, and/or data signals representative of the data transmitted by microcontroller 55, local memory 64 and/or wireless communication circuitry 68. In example embodiments, a dashboard, as shown in FIG. 22, is operatively coupled to microcontroller 55. The dashboard includes a display configured to display information related to the real-time user feedback.

Figure 9:
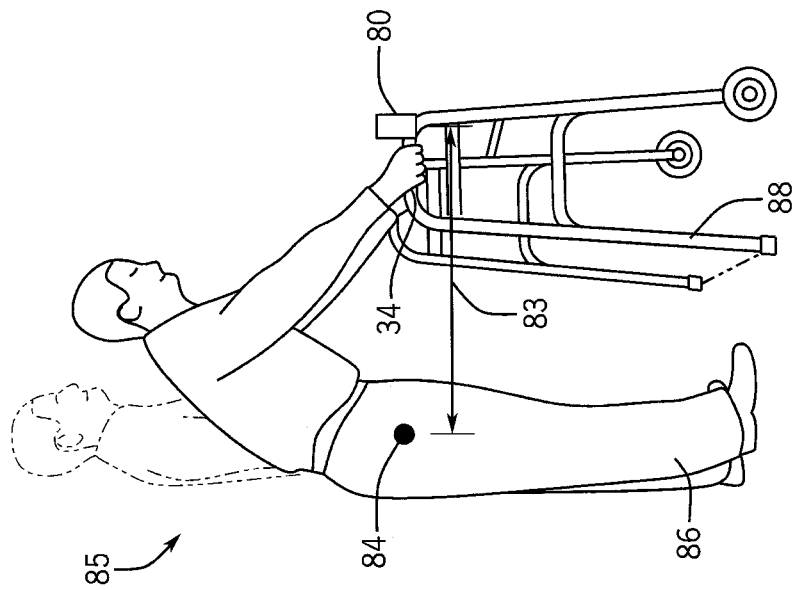
FIG. 9 illustrates an improper or incorrect user position with respect to a rollator during use of the rollator.
Figure 8:
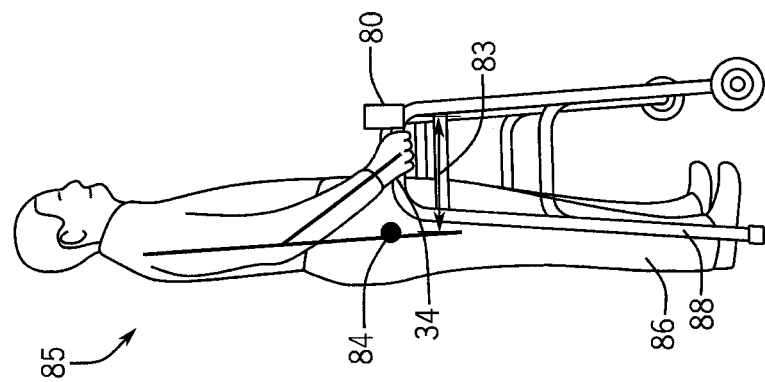
FIG. 8 illustrates a proper or correct user position with respect to a rollator during use of the rollator.

Referring again to FIGS. 2 and 3, in example embodiments, system 30 includes a hip sensing assembly 80 configured to be coupled to handle member 40 of rollator 32. Hip sensing assembly 80 includes a second sensor 82 coupled in signal communication with microcontroller 55. As shown in FIGS. 2 and 3, second sensor 82 is coupled to handle member 40 of rollator 32 and configured to measure a distance 83 between second sensor 82 and a hip 84 of a person 85 positioned with respect to rollator 32, e.g., at least partially within rollator 32, as shown in FIGS. 8 and 9. Second sensor 82 includes a time of flight sensor, an ultrasonic sensor, an infrared sensor, and/or another suitable sensor configured to measure distance 83 between second sensor 82 and hip 84 of person 85. In example embodiments, when distance 83 measured between second sensor 82 and the hip 84 exceeds a second threshold, microcontroller 55 activates feedback circuitry 50 to generate a second response, e.g., a suitable vibration response, haptic response, visual response, and/or auditory response, indicating to the user that the second threshold has been exceeded and instructing the user to adjust the user's position with respect to rollator 32 and/or to maintain a better posture. Microcontroller 55 is configured to adjust the second threshold to a value related to a height and/or an arm length of the user, for example. In example embodiments the second threshold is set to a value of 12 inches to 24 inches, and, more particularly, 15 inches and 20 inches, and, even more particularly, 18 inches. In alternative embodiments, the second threshold may be set to any suitable value, e.g., within the ranges set forth above, less than 12 inches or greater than 24 inches, based at least in part on the height of the user, an arm length of the user, and/or a level of mobility of the user, for example. Microcontroller 55 is configured to adjust an intensity of the second response generated by feedback circuitry 50 based at least in part on the measured distance 83. In a particular embodiment, dial 62 is adjustable by the user to adjust the intensity of the second response.

In example embodiments, each of the first response and the second response includes one or more of following: a visual response, an auditory response, a haptic response, and/or a vibration response to instruct the user to adjust the user's position with respect to rollator 32 and/or to maintain a better posture. For example, referring to FIGS. 8 and 9, each of grip assembly 34 and hip sensing assembly 80 is configured to detect, through sensing a force or a distance, respectively, when a user deviates from a proper or correct user position with respect to rollator 32 during use of rollator 32, as shown in FIG. 8, toward an improper or incorrect user position with respect to rollator 32, as shown in FIG. 9. Referring further to FIG. 8, when a user is properly positioned with respect to the rollator 32 during use, the user's arm is bent at the user's elbow about 15° with respect to the user's spine to position his/her hands on grip assemblies 34. In this proper position, the user exerts not greater than 10% of the user's bodyweight on each grip assembly 34, for example, and his/her feet are positioned at or near the rear legs of rollator 32. As the user deviates from the proper position to an improper position as shown in FIG. 9, the user's legs 86 begin to move away from rear legs 88 of rollator 32 and the angle at which the user's arm is bent at the elbow with respect to the user's spine increases above 15°. Further, the user exerts greater than 10% of the user's bodyweight on one or both grip assemblies 34.

In example embodiments, when first sensor 46 of grip assembly 34 senses this deviation through a force value exceeding the first threshold, first sensor 46 generates and transmits a corresponding signal to feedback circuitry 50 to generate the first response. Additionally, or alternatively, when second sensor 82 of hip sensing assembly 80 senses this deviation through a distance value exceeding the second threshold, second sensor 82 generates and transmits a corresponding signal to feedback circuitry 50 to generate the second response.

In example embodiments, accelerometer 54 is coupled in signal communication with microcontroller 55. Accelerometer 54 is configured to detect a change in acceleration of rollator 32, for example, when the user attempts to stand with assistance of rollator 32. In certain embodiments, when the first threshold is exceeded before accelerometer 54 detects a change in acceleration, microcontroller 55 generates a third response, e.g., an alert signal, indicating to the user to avoid using rollator 32 to stand up. Additionally or alternatively, when no change in acceleration is detected by accelerometer 54 for a determined period of time, for example, 60 seconds or less, and, more particularly, 45 seconds or less, and, even more particularly, 30 second or less to conserve battery power, accelerometer 54 transmits a signal to microcontroller 55 to enter sleep mode. In alternative embodiments, this period of time may be set to any suitable value, e.g., within the ranges set forth above or greater than 60 seconds. When a change in acceleration is detected by accelerometer 54, microcontroller 55 is activated from the sleep mode. Microcontroller 55 is configured to collect and store data related to each time accelerometer 54 detects a change in acceleration and when microcontroller 55 enters sleep mode.

In an alternative example embodiment as shown in FIG. 10, grip assembly 34 includes a flexible grip cover 90 that is configurable to wrap around and conform to at least a portion of an outer profile of hand grip 36 (not shown in FIG. 10). As shown in FIG. 10, grip cover 90 includes a first layer 92 configured to conform to an outer surface of hand grip 36 or directly to an outer surface of handle member 40. In such embodiment, first layer 92 is coupled to hand grip 36 or an existing hand grip at an end portion of handle member 40 using a suitable fastener, such as one or more straps, e.g., a plurality of straps 94, including hook-and-loop fasteners 96 and/or a suitable adhesive material, for example. A second layer 98 is disposed over first layer 92 and directly or indirectly contacts a surface of first layer 92. In example embodiments, second layer 98 is formed of a foam material or another suitable material having a thickness through which voids or cutouts are formed to house and secure components of grip cover 90.

For example, as shown in FIG. 10, a first cutout 100 is formed in second layer 98 near an end of hand grip 36 where a user would place a weight bearing portion of his/her hand. First cutout 100 is formed for accepting one or more first sensors 46, such as a button assembly 102 including an FSR 104. As shown in FIG. 10, button assembly 102 is housed within a stiff plastic ring 106 and configured to direct a force exerted on second layer 98 by the user's hand onto button assembly 102 and, more particularly, onto FSR 104. A second cutout 108 is formed in second layer 98 for accepting at least one feedback circuitry 50, such as a suitable vibration motor 110, communicatively coupled to microcontroller 55 (not shown in FIG. 10). A third layer 112 is configured to cover at least a portion of second layer 98, e.g., at least a portion of second layer 98 securing button assembly 102 and vibration motor 110. Third layer 112 is coupled to second layer 98 and/or first layer 92 to facilitate maintaining button assembly 102 and vibration motor 110 properly positioned within grip cover 90. In example embodiments, third layer 112 or an outer layer is made of a suitable water-resistant material including, without limitation, polychloroprene or another suitable foamed synthetic rubber material to cover the electronics and improve user comfort.

FIG. 11 shows an alternative example embodiment of grip cover 90, suitable for use with grip assembly 34, that is configurable to wrap around and confirm to at least a portion of an outer profile of hand grip 36. As shown in FIG. 11, grip cover 90 includes first layer 92 configured to conform to an outer surface of hand grip 36. In such embodiment, first layer 92 is coupled to hand grip 36 or an existing hand grip at an end portion of handle member 40 using a suitable fastener, such as one or more straps, e.g., a plurality of straps 94, including hook-and-loop fasteners 96, and/or a suitable adhesive material, for example. In example embodiments, one or more first sensors 46, such as FSR 104, and at least one feedback circuitry 50, such as vibration motor 110, are adhesively coupled to a surface of first layer 92. Second layer 98 is disposed over FSR 104, vibration motor 110, and at least a portion of first layer 92. Third layer 112 is configured to cover at least a portion of second layer 98 and is coupled to first layer 92 using a suitable fastening method, such as sewing third layer 112 to first layer 92 to secure second layer 98 in a desired position and maintain FSR 104 and vibration motor 110 properly positioned within grip cover 90. In such embodiments, third layer 112 or an outer layer is made of a suitable water-resistant material including, without limitation, polychloroprene or another suitable foamed synthetic rubber material to cover the electronics and improve user comfort.

Figure 12:
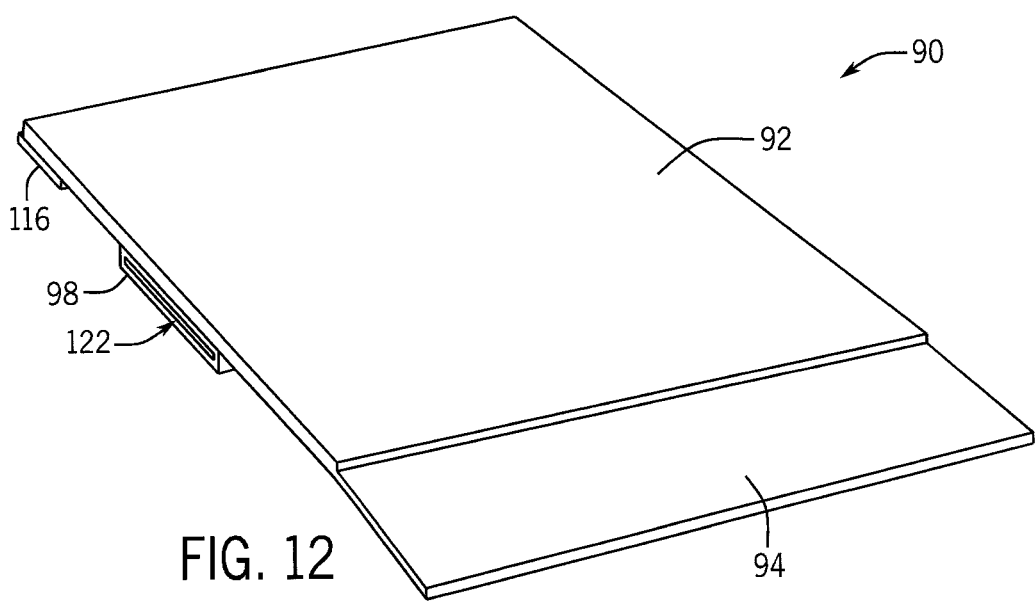
FIG. 12 is a perspective view of an example grip cover for a grip assembly, according to example embodiment.

Referring to FIGS. 12 and 13, in another alternative example embodiment, grip assembly 34 includes a grip cover 90 that is configurable to wrap around and conform to at least a portion of an outer profile of hand grip 36. Referring further to FIG. 13, grip cover 90 includes a first layer 92 configured to conform to an outer surface of handle member 36. In such embodiments, first layer 92 is coupled to hand grip 36 or an existing hand grip at an end portion of handle member 40 using a suitable fastener, such as a first strip 94 including hook-and-loop fasteners 96 positioned along a first side 114 of first layer 92 and a second strip 116 including cooperating hook-and-loop fasteners 118 positioned along a second side 120 of first layer 92 opposite the first side 114, for example. Second layer 98 is disposed under first layer 92, i.e., between a bottom surface of first layer 92 and an outer surface of hand grip 36. In example embodiments, second layer 98 is coupled to a bottom surface of first layer 92, i.e., the surface of first layer 92 facing the outer surface of hand grip 36, to form a pocket or sleeve 122. Sleeve 122 is configured to removable receive one or more first sensors 46, such as FSR 104, and at least one feedback circuitry 50, such as a suitable vibration motor 110, communicatively coupled to microcontroller 55 (not shown in FIGS. 12 and 13). First layer 92 is tightly wrapped and secured around hand grip 36 to maintain FSR 104 and vibration motor 110 properly positioned within grip cover 90. In such embodiments, first layer 92 or an outer layer is made of a suitable water-resistant material including, without limitation, polychloroprene or another suitable foamed synthetic rubber material to cover the electronics and improve user comfort.

In these alternative embodiments as shown in FIGS. 10-13, a comfortable pair of grip covers 90 for rollator 32 or a walker includes embedded electronics to train and monitor users on rollator or walker use habits. Grip cover 90 is configured such that the embedded electronics sit securely and directly on hand grips 36 and at least partially within grip cover 90. In the example embodiment shown in FIGS. 12 and 13, the embedded electronics are removably positionable within sleeve 122 to allow the electronics to be removed when grip cover 90 needs to be washed and/or replaced.

When the user begins to use rollator 32, grip cover 90 produces a voltage signals, such as an analog voltage signal, that is proportional to an amount of weight being placed on grip cover 90 and corresponding hand grip 36. The weight is measured using FSR 104. The voltage signals representative of the corresponding voltage values are processed by microcontroller 55. If the weight placed on grip cover 90 and hand grip 36 exceeds a certain threshold, which can be previously set by the user or the user's caregiver, microcontroller 55 powers vibration motor 110 within grip cover 90. Vibration motor 110 generates and transmits a vibration or haptic response providing feedback to the user, reminding the user to reduce the amount of weight that the user is placing on grip cover 90 and hand grip 36. The vibration intensity can be adjusted by the user or the user's caregiver via dial 62, a button, or another suitable mechanism operatively coupled to electronics circuitry 52. In example embodiments as described above, the weight threshold, i.e., the first threshold, is commonly set at 10% of the user's bodyweight. Weight values greater than the weight threshold may contribute to an undesirable change in an individual user's gait pattern.

In certain example embodiments, a display device is mounted to rollator 32. The display device is coupled in signal communication with electronics circuitry 52 and includes a display screen configured to display information related to data collected during use of rollator 32.

Figure 14:
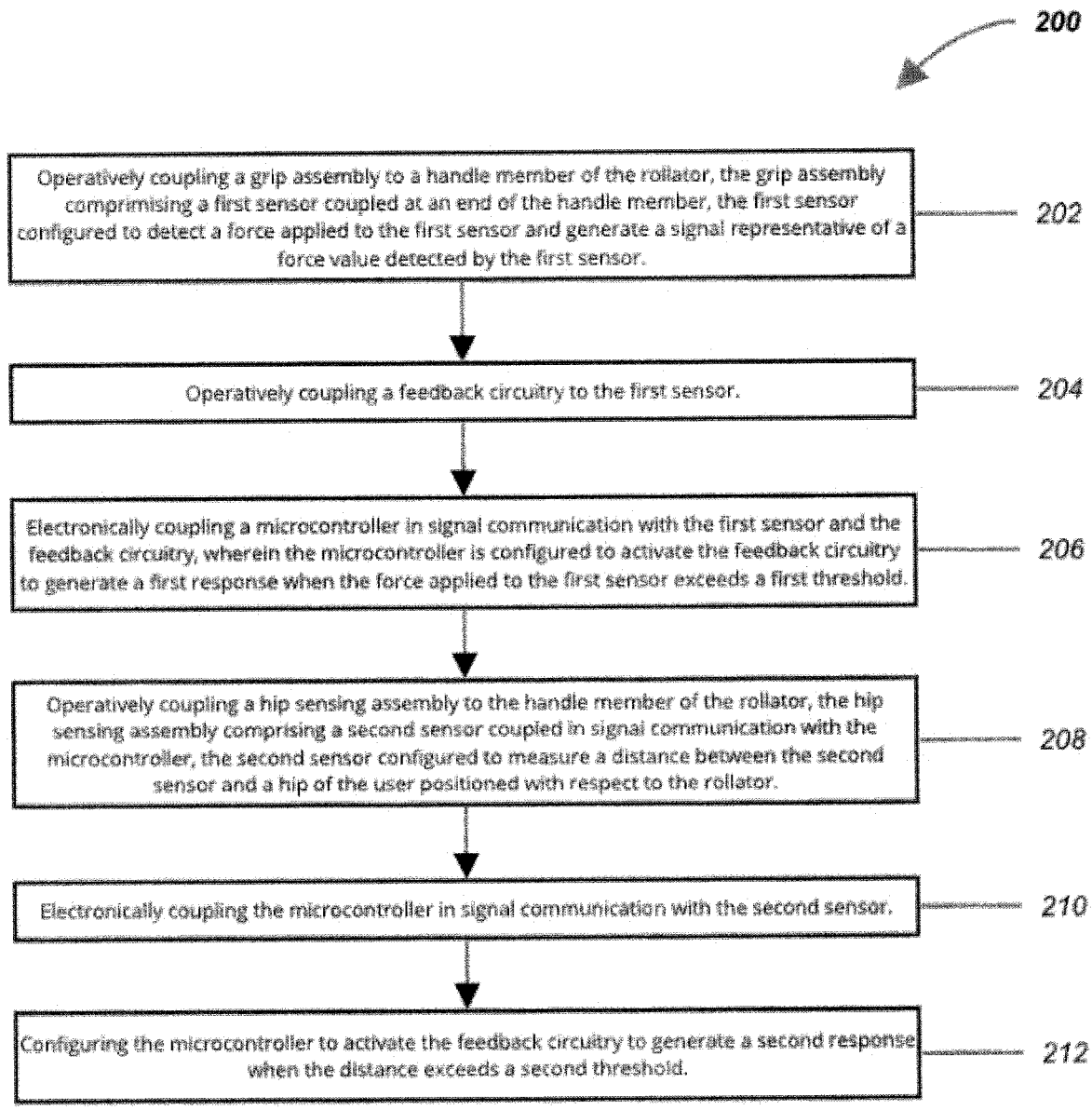
FIG. 14 is a flow diagram for an example method for monitoring mobility behaviors to train a user of a rollator on walking habits, according to an example embodiment.

FIG. 14 is a flow diagram for an example method 200 for monitoring mobility behaviors to train a user of a rollator on walking habits, according to an example embodiment. Method 200 includes operatively coupling 202 a grip assembly 34 to a handle member 40 of a rollator 32. Grip assembly 34 includes a first sensor 36 coupled at an end of handle member 40. First sensor 36 is configured to detect a force applied to grip assembly 34, e.g., on or in proximity to first sensor 36, and generate a signal representative of a force value detected by first sensor 36. A feedback circuitry 52 is operatively coupled 204 to first sensor 36. Microcontroller 55 is electrically coupled 206 in signal communication with first sensor 36 and feedback circuitry 50. Microcontroller 55 is configured to activate feedback circuitry 50 to generate a first response when the force applied to grip assembly 24 detected by first sensor 36 exceeds a first threshold. In certain example embodiments, example method 200 also includes operatively coupling 208 a hip sensing assembly to handle member 40 of rollator 32. Hip sensing assembly 80 includes a second sensor 82 coupled in signal communication with microcontroller 55. Second sensor 82 is configured to measure a distance between second sensor 82 and a hip 84 of the user positioned with respect to rollator 32. Microcontroller 55 is electronically coupled 210 in signal communication with second sensor 82. Microcontroller 55 is configured 212 to activate feedback circuitry 50 to generate a second response when the distance detected by second sensor 82 exceeds a second threshold.

In example embodiments, when example system 30 is activated, e.g., turns on, system 30 scans a wireless network connection strength, e.g., Wi-Fi strength, of known networks around system 30. If the Wi-Fi signal strength meets a minimum requirement, system 30 initiates a connection to the respective Wi-Fi network. System 30 then transfers data signals representative of data related to rollator use to remote computing device 68 and/or a remote server periodically. The data signals are processed to generate corresponding data that is then transmitted or transferred to the user's dashboard to display the data in a more readable way for use by the user, a doctor, a nurse, a therapist, and/or a caregiver, for example. If the user is outside of a Wi-Fi network or the network is not strong enough, microcontroller 55 transmits or transfers this data and the data is stored locally in a local data storage, e.g., local memory 64. When the user re-enters Wi-Fi range the data transfers from local memory 64 to remote computing device 68 and/or a remote server via wireless communication circuitry 66 in signal communication with remote computing device 68. The local storage can then be erased or wiped. Microcontroller 55 reads voltage values from first sensor 46, e.g., FSR 104. The voltage values are proportional to an amount of force or weight that is exerted on grip assembly 34 at or near first sensor 36. Microcontroller 55 activates vibration motor 110, for example, if the readings exceed the set first threshold, as discussed above. In example embodiments, system 30 also sends time and/or readings of triggered vibration feedback to the user's dashboard. Microcontroller 55 also reads force values that do not exceed the first threshold and uploads these values to remote computing device 68 and/or the remote server. This information is then transferred to the user's dashboard.

In example embodiments, accelerometer 54 reads changes in acceleration and will enter sleep mode after a period of inactivity. When a change in acceleration is detected or if first sensor 46 reads any value, system 30 will wake and continue to operate normally. When a large force sensor value is read before a change in acceleration is read, system 30 alerts the user to avoid using rollator 32 to stand up. System 30 also logs when accelerometer 54 detects a change in acceleration and when system 30 enters sleep mode. This information is used to track general daily activity of the user and inform caregivers if and/or when the user is using rollator 32.

Figure 15:
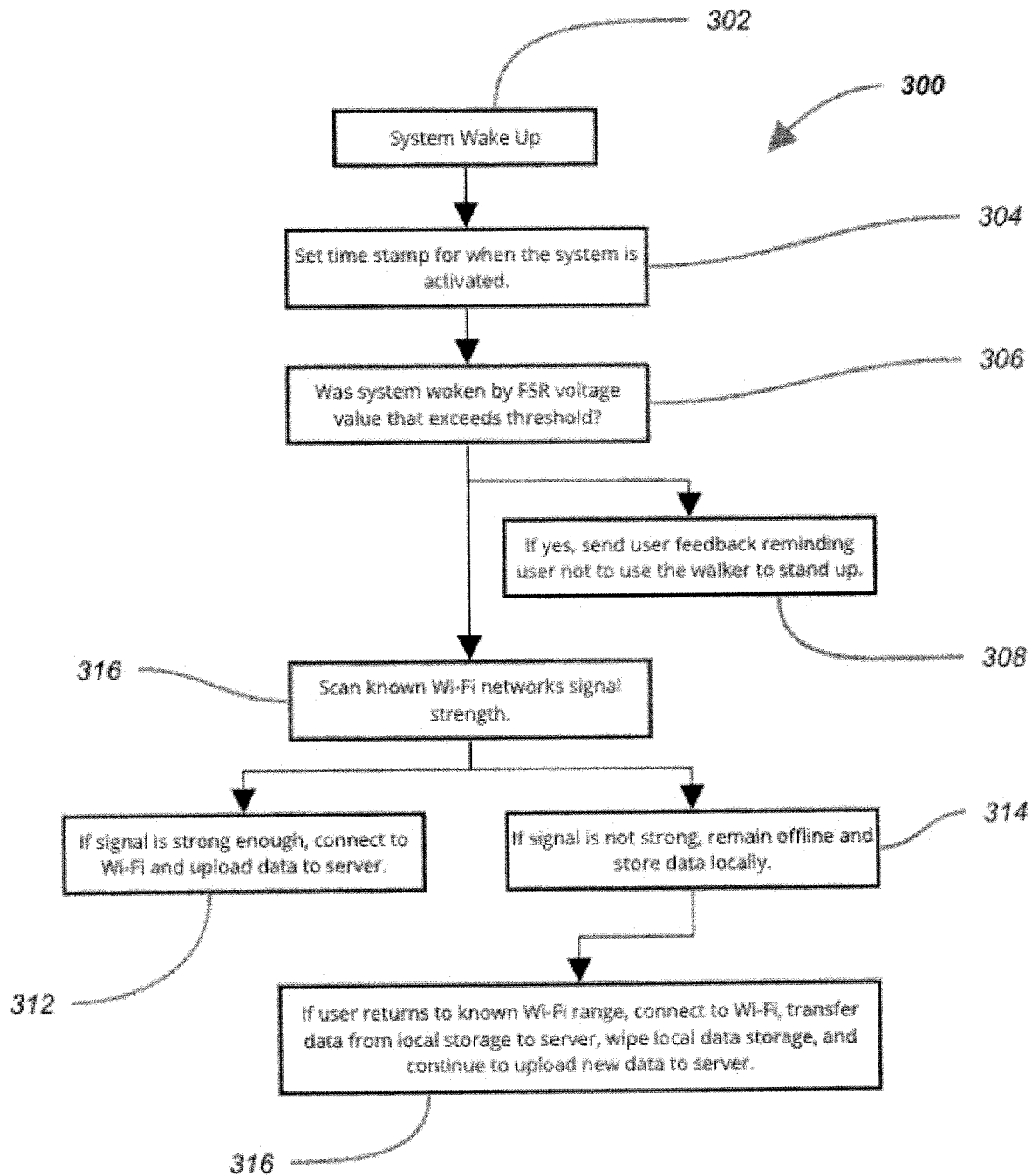
FIG. 15 is a flow diagram for an example method for operating an example grip assembly, according to an example embodiment.

FIG. 15 is a flow diagram for an example method 300 for operating grip assembly 34, according example embodiments described herein. Method 300 starts with system 30 waking up 302. A time stamp is set 304 indicating when system 30 is activated, e.g., wakes up. When system 30 is woken by first sensor 46 indicating a voltage value exceeding the first threshold 306, a user feedback is transmitted 308 reminding the user not to use rollator 32 to stand up. Otherwise, when system 30 is not woken by first sensor 46 indicating a voltage value exceeding the first threshold, system 30 scans 310 for a signal strength of one or more known wireless network connections, e.g., one or more known WiFi networks. When the signal strength is sufficiently strong 310, system 30 will connect 312 to the WiFi network and upload data stored locally in electronics circuitry 52 to remote computing device 68 and/or a remote server. When the signal strength is not sufficiently strong 314, system 30 will remain offline and store the collected data locally on local memory 64. When the user returns to or enters 316 a known WiFi range, system 30 connects to WiFi and transfers any locally stored data from local memory 64 to remote computing device 68 and/or a remote server. System 30 wipes the local data storage and continues to upload new data to remote computing device 68 and/or the remote server.

Figure 16:
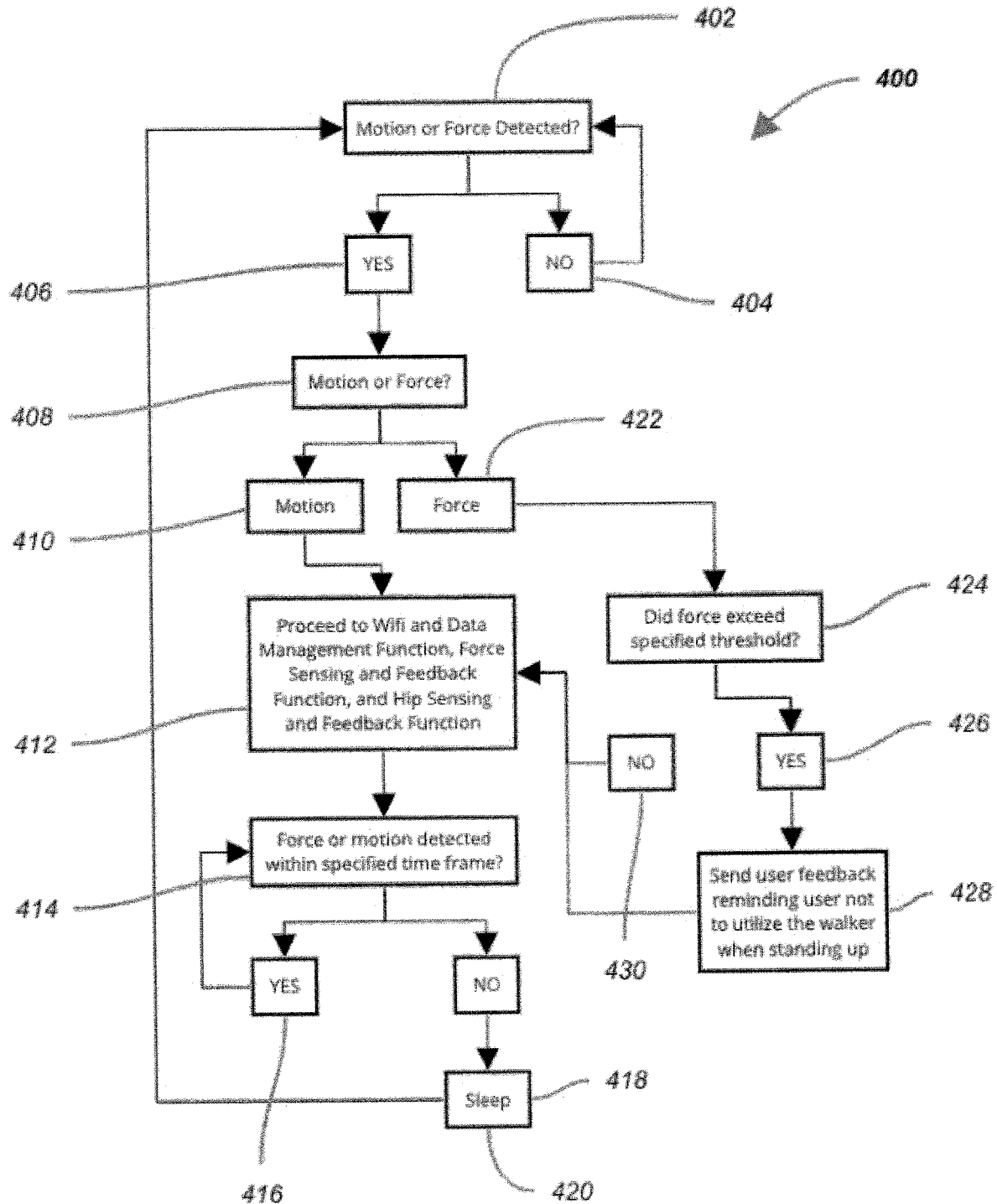
FIG. 16 is a flow diagram of an example method for determining whether the rollator has entered a sleep mode, according to an example embodiment.

Referring further to FIG. 16, in example embodiments, an example method 400 for determining whether rollator 32 has entered a sleep mode starts with determining 402 whether a motion and/or a force is detected by system 30. When no motion or force is detected by system 30, system 30 remains 404 in sleep mode. When, however, system 30 detects 406 a motion and/or a force, system 30 determines 408 whether a force or a motion was detected. When a motion is detected 410 by system 30, system 30 proceeds 412 to a WiFi and data management function, a force sensing and feedback function, and a hip sensing and feedback function. System 30 then continues to operate 414 to detect a force or motion within a specified time, e.g., for a few seconds upon wakeup in order for system 30 to register that the user's hands are on grip assemblies 34 before system 30 enters into a normal operation mode. System 30 continues to operate 414 when a force and/or a motion is detected 416 within the specified time. When no force or motion is detected 418 within the specified time, system 30 enters sleep mode 420.

When a force is detected 422 by system 30, system 30 determines 424 whether the force exceeds a specified threshold, e.g., the first threshold. When the force exceeds the specified threshold 426, system 30 sends or transmits 428 a feedback response reminding the user not to utilize rollator 32 when standing up. When system 30 determines 430 that the force does not exceed the specified threshold, system 30 continues to the WiFi and data management function, the force sensing and feedback function, and the hip sensing and feedback function 412.

Figure 17:
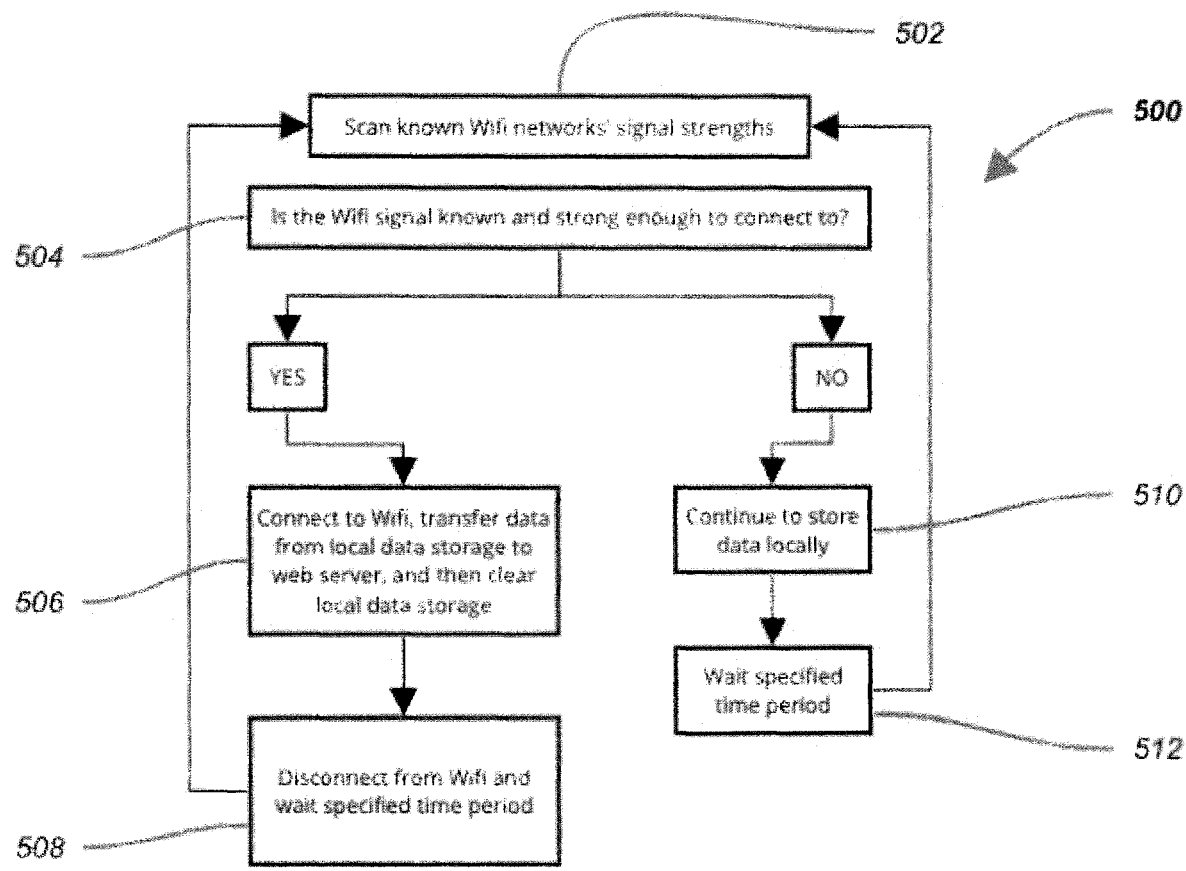
FIG. 17 is a flow diagram of an example method for connecting an example system to a wireless network, such as WiFi, according to an example embodiment.

FIG. 17 is a flow diagram of an example method 500 for connecting system 30 to a wireless network, such as a WiFi network. System 30 scans 502 signal strengths of one or more known WiFi networks. System 30 determines 504 whether a signal associated with the known WiFi network is sufficiently strong and, if so, system 30 connects 506 to the known WiFi network. Once connected, system 30 transfers data from the local data storage to remote computing device 68 and/or a remote server and then clears the local data storage. System 30 then disconnects 508 from the WiFi network connection and waits a specified time period. When system 30 determines 510 that the signal of the known WiFi network is not sufficiently strong, system 30 continues to store data in the local data storage. System 30 waits 512 a specified time period.

Figure 18:
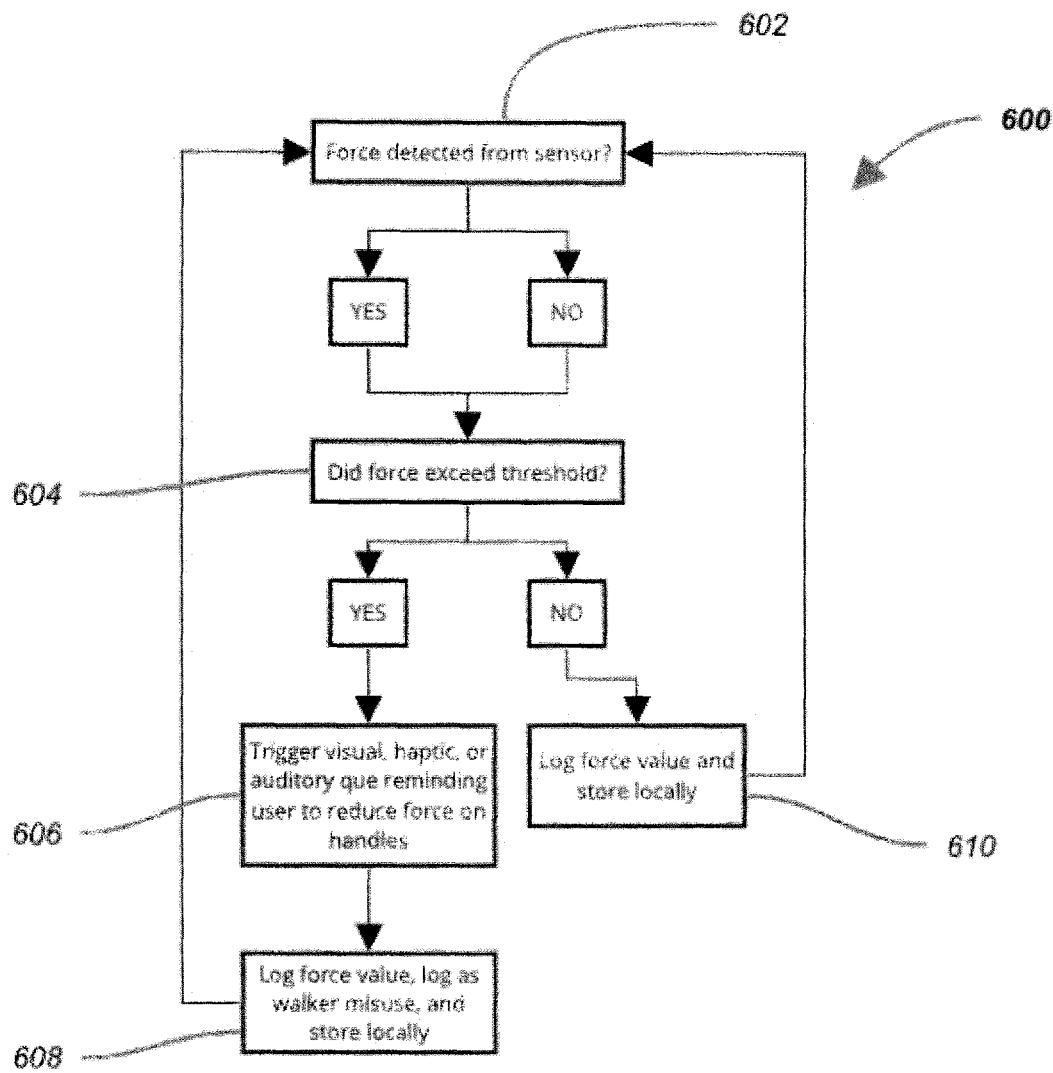
FIG. 18 is a flow diagram of an example method for determining a force value applied to a grip assembly during use of an example rollator, according to an example embodiment.

FIG. 18 is a flow diagram of an example method 600 for determining a force applied to a grip assembly detected by first sensor 46, according to an example embodiment. As shown in FIG. 18, method 600 begins with system 30 determining 602 whether first sensor 46 detects a force value. System 30 then determines 604 whether the force value exceeds a specified threshold, e.g., the first threshold described above. When the force detected by first sensor 46 exceeds the specified threshold, system 30 activates 606 one or more of a visual response, a haptic response, and/or an auditory response reminding the user to reduce the force applied to hand grip 36. System 30 then logs the force value, indicating a rollator misuse, and stores the collected data locally 608. When the force detected by first sensor 46 does not exceed the specified threshold, system 30 logs the force value and stores the collected data locally 610.

Figure 19:
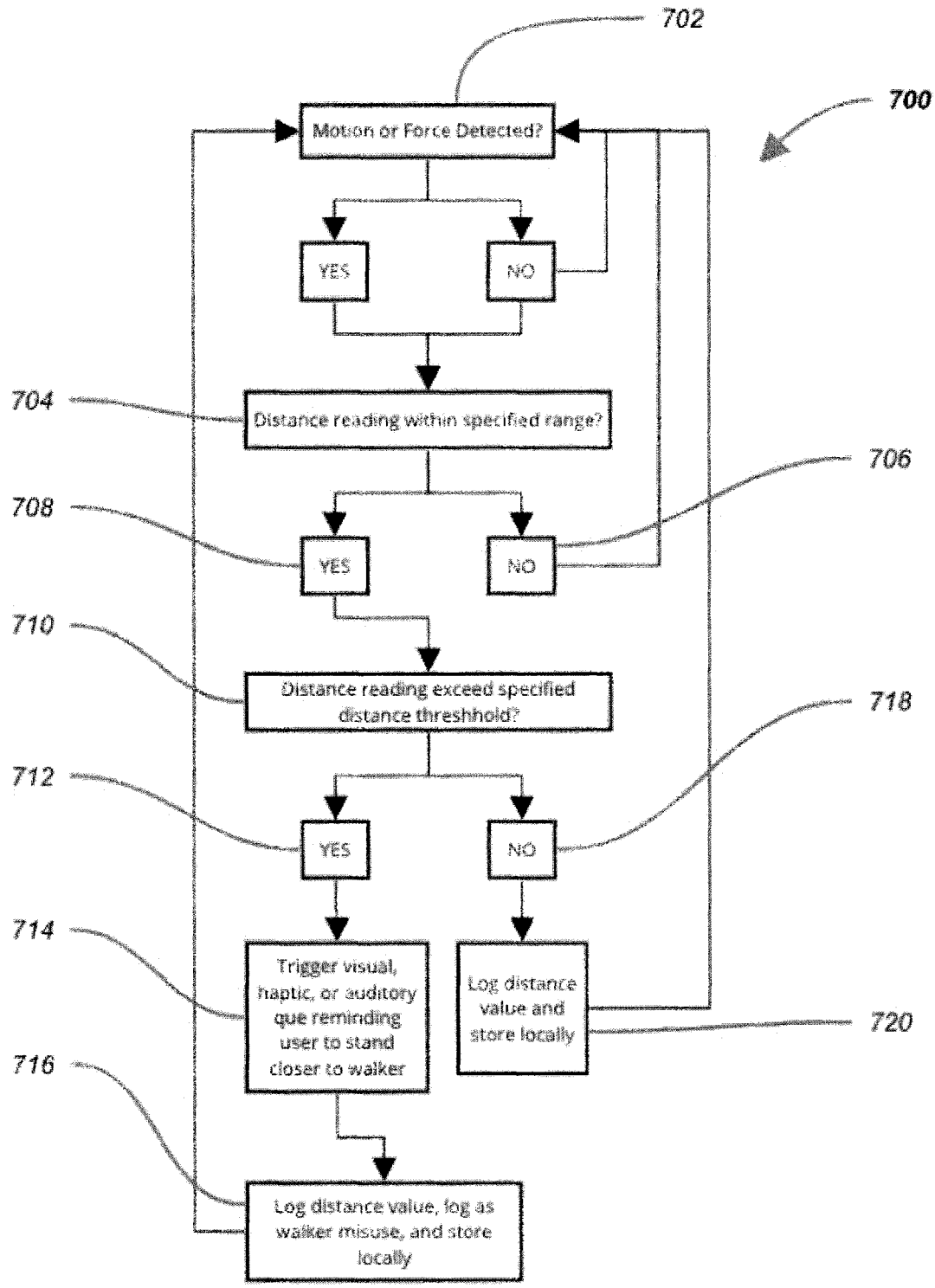
FIG. 19 is a flow diagram of an example method for determining a distance value during use of an example rollator, according to an example embodiment.

FIG. 19 is a flow diagram of an example method 700 for operating an example hip sensing assembly, according to an example embodiment. As shown in FIG. 19, method 700 begins with system 30 determining 702 whether second sensor 82 detects a motion or a force. System 30 then determines 704 whether the distance value detected by second sensor 82 is within a specified range. When the distance value is not within the specified range 706, system 30 returns to step 702. Alternatively, when the distance value detected by second sensor 82 is within a specified range 708, system 30 then determines 710 whether the distance value exceeds a specified threshold, e.g., the second threshold described above. When the detected distance exceeds the specified threshold 712, system 30 activates 714 one or more of a visual response, a haptic response, and/or an auditory response reminding the user to stand closer to rollator 30. System 30 then logs the distance value, indicating a rollator misuse, and stores the collected data locally 716. When the detected distance value does not exceed the specified threshold 718, system 30 logs the distance value and stores the collected data locally 720.

Figure 20:
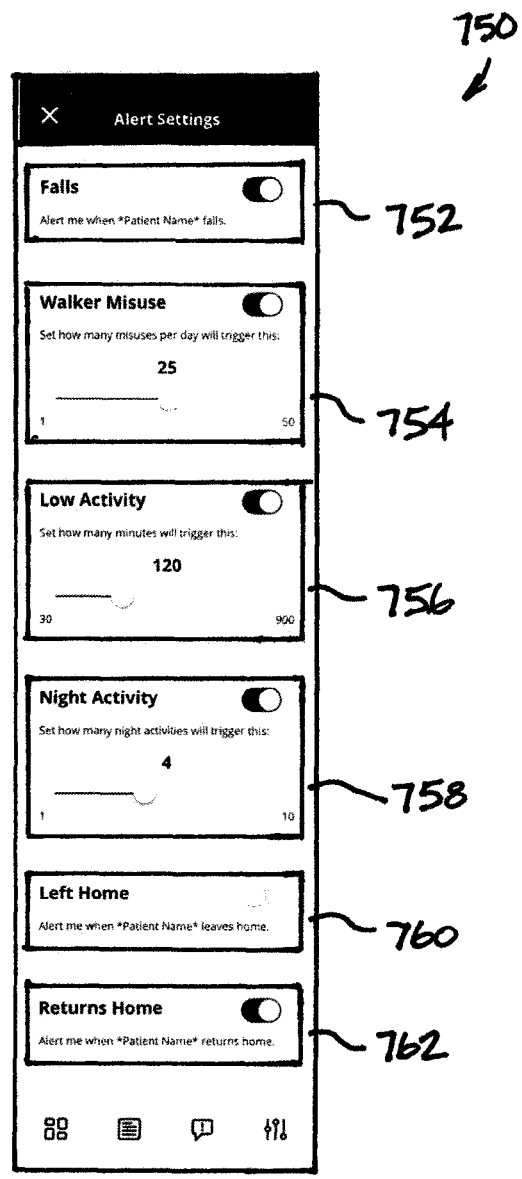
FIG. 20 illustrates an example notifications page for a mobile device application, according to an example embodiment.

Referring now to FIG. 20, in example implementations, a user-facing mobile device application interfaces with the database. FIG. 20 illustrates an example notifications page 750 for a mobile device application, according to an example embodiment. The mobile device application allows a user to create an account, pair one or more devices to the account, and provide wireless network credentials, e.g., Wi-Fi credentials, associated with the one or more devices. With a paired device, the user is provided user inputs to enter information associated with the user, such as an age, a sex, a weight, a payment method (Stripe/Square), customize notifications, and use the application to interact with the data associated with the user. The user can have multiple systems 30 associated with the same account, and multiple accounts per system 30. With only one account per system 30, if notifications are changed on one paired device, the same notifications will be applied to other devices paired with the same account.

As shown in FIG. 20, in example embodiments, a user receives and reviews suitable notifications on the user's mobile device using a mobile device application. Suitable thresholds for each notification can be set by the user or a care provider. Suitable notifications appearing on notifications page 750 include, without limitation, a fall notification 752 when the user falls while using rollator 32; a rollator misuse notification 754 in which a threshold can be set by the user or care provider to provide a notification when a number of rollator misuses occur in a set time period, for example when the threshold is exceeded in a given day; an inactivity or low activity notification 756 (such notification may indicate a time period in which the rollator has been inactive, e.g., 120 minutes); a night time activity notification 758, indicating a number of movements detected during the night time; a wandering notification 760, for example, when the rollator leaves a wireless network range, e.g., a WIFI network range, indicating that the user may have left the user's house or a designated room; and/or a return home notification 762, indicating that the user has returned to the user's house or designated room.

Figure 21:
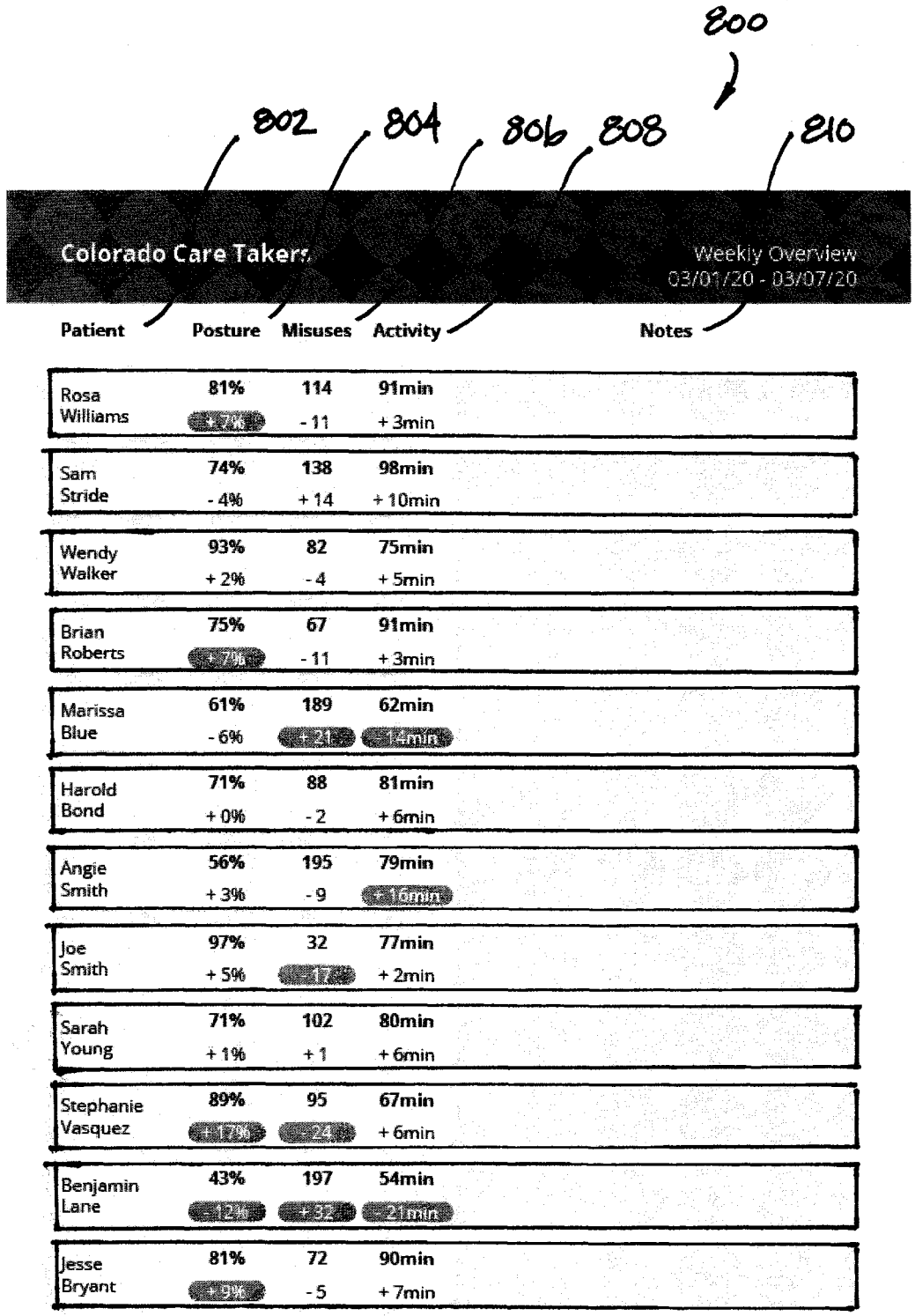
FIG. 21 illustrates a periodic overview report generated using data collected related to patient use of an example rollator equipped with the example system suitable for use by a home health agency administrative staff or care provider, for example, according to an example embodiment.

In example embodiments, reports can be generated, for example, at remote computing device 68, based on the data collected related to the use by one or more users, e.g., patients, of rollator 32 including system 30. As shown in FIG. 21, a report 800 suitable for use by a home health agency administrative staff or care provider, for example, is generated at remote computing device 68, for example. Report 800 may be a paper report and/or an editable electronic report. Report 800 summarizes patient use of rollator 32 equipped with system 30. Report 800 may track one or more patient's use of a respective rollator 32. For example, a home care provider, e.g., "Colorado Care Takers," may track use of a rollator 32 by one or more patients, e.g., 12 patients. In example embodiments, report 800 provides information including, without limitation, high level metrics for each patient, as well as traits and/or trends associated with those metrics for a previous time period, e.g., the previous week as shown in report 800. Report 800 may include an overview page, such as shown in FIG. 21, that indicates a patient's name 802, a posture score 804, a number of misuses 806, and/or an activity level 808 for each individual patient. A note section 810 allows the home care provider to enter notes regarding the patient and his/her usage of rollator 32. Report 800 may include any suitable information and/or data related to the patient's use of rollator 32.

Referring further to FIG. 21, a patient's, e.g., Rosa Williams, weekly use of rollator 32 indicates that her posture score 804 is 81%, increasing by 7% over her posture score for the previous week, her number of misuses 806 of rollator 32 during the week was 114, a decrease in 11 misuses over last week, and her activity level 808 for the week was 91 minutes, an increase of 3 minutes over her activity level for the previous week. This information can be utilized by the home care provider to ensure that Rosa Williams continues to show mobility improvement and/or proper walking habits through an individualized program.

Referring now to FIG. 22, a weekly overview 900 for each patient, e.g., Rosa Williams, provides more in-depth information on health metrics including, without limitation, activity level information 902, posture score information 904, walker misuse events information 906 and/or an information snapshot 908 providing comparative data, for example, for the individual patient using rollator 32. A note section 910 allows the home care provider to enter notes regarding Rosa Williams' usage of rollator 32. Weekly overview 900 is generated using data visualization, statistics, and/or numbers to present the collected data. As shown in FIG. 22, weekly overview 900 displays or indicates additional information regarding Rosa Williams' weekly use of rollator 32 including, without limitation, a current score 912, a goal 914, and a weekly change 916 related to her activity level information 902, for example, during the week of Jan. 19, 2020 through Jan. 25, 2020.

The various embodiments described herein can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors, and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

Embodiments of the disclosure can be described in view of the following clauses:

1A. A grip assembly configured to be coupled to a handle member of a rollator, the grip assembly comprising:
 a first sensor configured to detect a force applied to the grip assembly and generate a signal representative of the force detected by the first sensor;
 a feedback circuitry operatively coupled to the first sensor; and
 a microcontroller coupled in signal communication with the first sensor and the feedback circuitry, wherein, when the force exceeds a first threshold, the microcontroller activates the feedback circuitry to generate a first response indicating to a user of the rollator that the first threshold has been exceeded.

2A. The grip assembly according to clause 1A, wherein the first sensor comprises one of a force sensor, a force sensitive resistor, a capacitive sensor, a load cell, or a strain gauge.

3A. The grip assembly according to any of clauses 1A or 2A, further comprising a hand grip, wherein the first sensor, the feedback circuitry, and the microcontroller are integrated with the hand grip.

4A. The grip assembly according to any of clauses 1A or 2A, further comprising:
a grip cover, the grip cover comprising:
  a first layer configured to conform to a surface of a hand grip coupled to an end of the handle member, the first layer coupled to the hand grip;
  a second layer disposed over the first layer, the second layer configured to secure the first sensor at the end of the handle member, the second layer configured to align the first sensor with a weight bearing portion of a hand of the user to direct the force onto the first sensor; and
  a third layer covering the first sensor and coupled to the first layer.

5A. The grip assembly according to any of clauses 1A or 2A, further comprising a grip cover, the grip cover comprising a layer including a sleeve forming an opening in which the first sensor is removably positionable, the layer configured to align the first sensor with a weight bearing portion of a hand of the user to direct the force onto the first sensor.

6A. The grip assembly according to any of clauses 1A-5A, wherein the first sensor generates a signal representative of the force applied by the user to the grip assembly, and the first sensor transmits the signal to the microcontroller, the microcontroller configured to process the signal and generate a data signal.

7A. The grip assembly according to any of clauses 1A-6A, wherein the microcontroller is configured to transmit the data signal to a remote computing device coupled in signal communication with the microcontroller.

8A. The grip assembly according to any of clauses 1A-7A, further comprising an electronics circuitry, wherein the electronics circuitry comprises:
the microcontroller;
a local memory operatively coupled to the microcontroller for storing data collected by the microcontroller; and
a wireless communication circuitry in signal communication with the microcontroller and a remote computing device, the wireless communication circuitry configured to transmit a data signal to the remote computing device representative of the force applied by the user to the grip assembly.

9A. The grip assembly according to clause 8A, further comprising a display device in signal communication with the electronics circuitry and comprising a display screen configured to display information related to the data.

10A. The grip assembly according to any of clauses 1A-9A, further comprising an accelerometer coupled in signal communication with the microcontroller, the accelerometer configured to detect a change in acceleration of the rollator, wherein, when the first threshold is exceeded before the accelerometer detects a change in acceleration, the microcontroller generates an alert signal indicating to the user to avoid using the rollator to stand up.

11A. The grip assembly according to clause 10A, wherein, when no change in acceleration is detected by the accelerometer for a determined period of time, the accelerometer transmits a signal to the microcontroller to enter sleep mode.

12A. The grip assembly according to clause 11A, wherein, when a change in acceleration is detected by the accelerometer, the microcontroller is activated from the sleep mode.

13A. The grip assembly according to any of clauses 10A-12A, wherein the microcontroller collects data related to each time the accelerometer detects a change in acceleration and when the microcontroller enters sleep mode.

14A. The grip assembly according to any of clauses 1A-13A, wherein the microcontroller is configured to adjust an intensity of the first response generated by the feedback circuitry.

15A. The grip assembly according to clause 14A, further comprising a dial operatively coupled to the microcontroller, the dial adjustable by the user to adjust the intensity of the first response.

16A. The grip assembly according to any of clauses 1A-15A, wherein the microcontroller is configured to adjust the first threshold to a value not greater than 20% of a bodyweight of the user.

17A. The grip assembly according to any of clauses 1A-16A, wherein the microcontroller is configured to generate real-time biofeedback to prompt the user to self-correct to a safe posture and position.

18A. The grip assembly according to clause 17A, further comprising a dashboard operatively coupled to the microcontroller, the dashboard configured to display information related to the real-time biofeedback.

19A. The grip assembly according to any of clauses 1A-18A, further comprising a hip sensing assembly configured to be coupled to the handle member of the rollator, the hip sensing assembly comprising:
a second sensor coupled in signal communication with the microcontroller, the second sensor configured to measure a distance between the second sensor and a hip of the user positioned with respect to the rollator, wherein, when the distance exceeds a second threshold, the microcontroller activates the feedback circuitry to generate a second response indicating to the user that the second threshold has been exceeded.

20A. The grip assembly according to any of clauses 1A-19A, wherein the feedback circuitry is configured to generate one of more of following: a visual response, an auditory response, a haptic response, or a vibration response. 21A. A system operatively coupled to a rollator for monitoring usage of the rollator, the system comprising:
a grip assembly configured to be coupled to a handle member of the rollator, the grip assembly comprising:
  a first sensor coupled to the handle member, the first sensor configured to detect a force applied to the first sensor and generate a signal representative of a force value detected by the first sensor;
  a feedback circuitry operatively coupled to the first sensor; and
  a microcontroller electronically coupled in signal communication with the first sensor and the feedback circuitry, wherein, when the force applied to the first sensor exceeds a first threshold, the microcontroller activates the feedback circuitry to generate a first response indicating to a user of the rollator that the first threshold has been exceeded; and a hip sensing assembly configured to be coupled to the handle member of the rollator, the hip sensing assembly comprising:

a second sensor coupled in signal communication with the microcontroller, the second sensor configured to measure a distance between the second sensor and a hip of the user positioned with respect to the rollator, wherein, when the distance exceeds a second threshold, the microcontroller activates the feedback circuitry to generate a second response indicating to the user that the second threshold has been exceeded.

22A. The system according to clause 21A, wherein the first sensor comprises one of a force sensor, a capacitive sensor, a load cell, or a strain gauge.

23A. The system according to any of clauses 21A or 22A, wherein the second sensor comprises one of a time of flight sensor, an ultrasonic sensor, or an infrared sensor.

24A. The system of any of clauses 21A-23A, wherein each of the first response and the second response comprises one or more of following: a visual response, an auditory response, a haptic response, or a vibration response.

25A. A grip cover configured to be coupled to a rollator handle, the grip cover comprising:

a first layer configured to conform to an outer profile of a hand grip coupled at an end of the rollator handle, the first layer coupled to the hand grip;

a second layer disposed on the first layer, the second layer comprising:

a force sensitive resistor (FSR) configured to detect a force applied to the second layer and generate a signal representative of a force value detected by the FSR; and a vibration motor operatively coupled to the FSR;

a third layer covering the FSR and coupled to the first layer; and a microcontroller coupled in signal communication with the FSR and the vibration motor, wherein, when the force applied to the second layer exceeds a force value threshold, the microcontroller activates the vibration motor to generate a haptic feedback indicating the force value threshold has been exceeded.

26A. A method for monitoring mobility behaviors to train a user of a rollator on walking habits, the method comprising:

operatively coupling a grip assembly to a handle member of the rollator, the grip assembly comprising a first sensor coupled at an end of the handle member, the first sensor configured to detect a force applied to the first sensor and generate a signal representative of a force value detected by the first sensor;

operatively coupling a feedback circuitry to the first sensor; and electronically coupling a microcontroller in signal communication with the first sensor and the feedback circuitry, wherein the microcontroller is configured to activate the feedback circuitry to generate a first response when the force applied to the first sensor exceeds a first threshold.

27A. The method according to clause 26A, further comprising:

operatively coupling a hip sensing assembly to the handle member of the rollator, the hip sensing assembly comprising a second sensor coupled in signal communication with the microcontroller, the second sensor configured to measure a distance between the second sensor and a hip of the user positioned with respect to the rollator;

electronically coupling the microcontroller in signal communication with the second sensor; and configuring the microcontroller to activate the feedback circuitry to generate a second response when the distance exceeds a second threshold.

As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The terms "implementation" and "embodiment" are intended to mean "an example of." Unless explicitly stated to the contrary, the phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system operatively coupled to a rollator for monitoring usage of the rollator by a user, the system comprising:

a grip assembly configured to be coupled to a handle member of a rollator, the grip assembly comprising:

a sensor configured to detect a force applied to the rollator by the user and generate a signal representative of the force detected by the sensor; and a cover configured to couple to the handle member, the cover having an openable sleeve defined therein between a first layer and an opposing second layer of the cover, into which sleeve the sensor is removably disposed, the sleeve defining an opening through which the sensor is removably positionable within the sleeve, the cover configured to align the sensor with a weight bearing portion of a hand of a user and permit the user to both selectively remove the sensor from the sleeve and reinsert the sensor back into the sleeve; and an electronics circuitry configured to be coupled to the rollator, the electronics circuitry comprising:

a microcontroller electrically coupled in signal communication with the sensor; and a feedback circuitry operatively coupled to the microcontroller, wherein, when the force detected by the sensor exceeds a threshold, the microcontroller activates the feedback circuitry to generate a response indicating that the threshold has been exceeded.

2. The system according to claim 1, wherein the sensor comprises one or more of the following: a force sensor, a force sensitive resistor, a capacitive sensor, a load cell, or a strain gauge.

3. The system according to claim 1, wherein the grip assembly further comprises a cover configured to couple to the handle member, wherein the sensor is integrated with the cover and the sensor is configured to detect a force from a weight bearing portion of a hand of the user on the handle member.

4. The system according to claim 1, wherein the feedback circuitry is integrated with the grip assembly.

5. The system according to claim 1, wherein the cover comprises:
   a first portion configured to conform to a surface of a hand grip coupled to the handle member; and
   a second portion disposed over at least a portion of the first portion, the second portion configured to secure the sensor with respect to the handle member, the second portion configured to align the sensor with a weight bearing portion of a hand of the user.

6. The system according to claim 1, wherein the sensor generates a signal representative of the force applied by the user to the handle member, and the sensor transmits the signal to the microcontroller, the microcontroller configured to process the signal and generate a data signal.

7. The system according to claim 6, wherein the microcontroller is configured to transmit the data signal to a remote computing device coupled in signal communication with the microcontroller.

8. The system according to claim 1, wherein the electronics circuitry further comprises:
   a local memory operatively coupled to the microcontroller for storing data collected by the microcontroller; and
   a wireless communication circuitry in signal communication with the microcontroller and a remote computing device, the wireless communication circuitry configured to transmit a data signal to the remote computing device representative of the force applied by the user to the grip assembly.

9. The system according to claim 1, further comprising a display device in signal communication with the electronics circuitry, the display device comprising a display screen configured to display information related to data collected by the microcontroller.

10. The system according to claim 1, further comprising an accelerometer coupled in signal communication with the microcontroller, the accelerometer configured to detect an acceleration of the rollator, wherein, when the threshold is exceeded before the accelerometer detects an acceleration, the microcontroller generates an alert signal.

11. The system according to claim 1, wherein the microcontroller is configured to adjust an intensity of the response generated by the feedback circuitry.

12. The system according to claim 1, wherein the microcontroller is configured to adjust the threshold to a value not greater than 20% of a bodyweight of the user.

13. The system according to claim 1, wherein the microcontroller is configured to generate real-time biofeedback to prompt the user to self-correct to at least one of a safe posture or a safe position.

14. The system according to claim 13, further comprising a dashboard operatively coupled to the microcontroller, the dashboard configured to display information related to the real-time biofeedback.

15. The system according to claim 1, wherein the feedback circuitry is configured to generate one of more of the following: a visual response, an auditory response, a haptic response, or a vibration response.

16. A cover configured to conform to an outer profile of a hand grip coupled to a handle of a rollator, the cover comprising:
   an openable sleeve having a first layer and an opposing second layer affixed to each other and defining an opening therein;
   a sensor disposed within the sleeve and configured to:
      be selectively removable from, and reinsertable back into, the sleeve through the opening defined therein,
      detect a force applied to the cover and generate a signal representative of a force value detected by the sensor, and
      be removably positionable within the sleeve through the opening; and
   a vibration motor operatively coupled to the sensor and coupled in signal communication with a microcontroller, wherein, when the force applied to the cover exceeds a force value threshold, the microcontroller activates the vibration motor to generate a haptic feedback indicating the force value threshold has been exceeded.

17. The cover according to claim 16, further comprising a feedback circuitry coupled in signal communication with the microcontroller, the feedback circuitry configured to generate one of more of a visual feedback or an auditory feedback when the force applied to the cover exceeds the force value threshold.

18. A system operatively coupled to a rollator for monitoring usage of the rollator by a user, the system comprising:
   a housing configured to be coupled to a frame of a rollator, the housing configured to house:
      a sensor configured to measure a distance between the sensor and a hip of the user positioned with respect to the rollator and generate a signal representative of the distance; and
      an electronics circuitry comprising:
         a microcontroller electrically coupled in signal communication with the sensor, the microcontroller configured to receive the signal generated by the sensor; and
         a feedback circuitry operatively coupled to the microcontroller,
      wherein, when the distance measured between the sensor and the hip exceeds a threshold, the microcontroller activates the feedback circuitry to generate a response indicating to the user that the threshold has been exceeded.

19. The system according to claim 18, wherein the feedback circuitry comprises a vibration motor operatively coupled to a handle of the rollator, the vibration motor coupled in signal communication with a microcontroller, wherein, when the distance exceeds the threshold, the microcontroller activates the vibration motor to generate a haptic feedback to the user.

20. The system according to claim 18, wherein the feedback circuitry is configured to generate one of more of the following: a visual response, an auditory response, a haptic response, or a vibration response.

21. The system according to claim 18, wherein the sensor comprises one or more of a time of flight sensor, an ultrasonic sensor, or an infrared sensor.

22. A system operatively coupled to a rollator for monitoring usage of the rollator by a user, the system comprising:
   a housing configured to be coupled to a frame of a rollator, the housing configured to house:

a sensor configured to measure a distance between the sensor and a hip of the user positioned with respect to the rollator and generate a signal representative of the distance; and an electronics circuitry comprising:

a microcontroller electrically coupled in signal communication with the sensor, the microcontroller configured to receive the signal generated by the sensor; and a feedback circuitry operatively coupled to the microcontroller; and a clamp system configured to couple the housing to the frame, the clamp system configured to allow independent rotation of the housing about a first axis and a second axis perpendicular to the first axis, wherein, when the distance measured between the sensor and the hip exceeds a threshold, the microcontroller activates the feedback circuitry to generate a response indicating to the user that the threshold has been exceeded.

* * * * *